(12) United States Patent
Xie et al.

(10) Patent No.: US 12,051,174 B2
(45) Date of Patent: Jul. 30, 2024

(54) ENERGY-BASED GENERATIVE MODELS VIA COARSE-TO-FINE EXPANDING AND SAMPLING

(71) Applicant: Baidu USA, LLC, Sunnyvale, CA (US)

(72) Inventors: Jianwen Xie, Santa Clara, CA (US); Yang Zhao, Buffalo, NY (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 350 days.

(21) Appl. No.: 17/478,776

(22) Filed: Sep. 17, 2021

(65) Prior Publication Data

US 2022/0108426 A1 Apr. 7, 2022

Related U.S. Application Data

(60) Provisional application No. 63/086,496, filed on Oct. 1, 2020.

(51) Int. Cl.
*G06T 3/4053* (2024.01)
*G06F 18/20* (2023.01)
*G06F 18/214* (2023.01)

(52) U.S. Cl.
CPC .......... *G06T 3/4053* (2013.01); *G06F 18/214* (2023.01); *G06F 18/295* (2023.01)

(58) Field of Classification Search
CPC .... G06T 3/4053; G06F 18/214; G06F 18/295
See application file for complete search history.

(56) References Cited

U.S. PATENT DOCUMENTS

| | | | |
|---|---|---|---|
| 2019/0171936 A1* | 6/2019 | Karras | G06N 3/084 |
| 2021/0241500 A1* | 8/2021 | Chen | G06N 20/00 |
| 2021/0390375 A1* | 12/2021 | Luo | G06T 5/009 |

OTHER PUBLICATIONS

Xie et al.,"Cooperative training of descriptor and generator networks," IEEE Transactions on Pattern Analysis and Machine Intelligence (TPAMI), 42(1):27-45, 2018.(19 pgs).

(Continued)

*Primary Examiner* — Casey L Kretzer
(74) *Attorney, Agent, or Firm* — NORTH WEBER & BAUGH LLP

(57) ABSTRACT

Presented herein are embodiments of energy-based models (EBMs), which may be trained via embodiments of a multistage coarse-to-fine expanding and sampling strategy. Embodiments of the training methodology start with learning a coarse-level EBM from images at low resolution and then gradually transits to learn a finer-level EBM from images at higher resolution by expanding the energy function as the learning progresses. Embodiments are computationally efficient with smooth learning and sampling. Tested embodiments achieved the best performance on image generation amongst all EBMs and successfully synthesized high-fidelity images. Embodiments may also be used for image restoration and out-of-distribution detection. Framework embodiments may be further generalized for one-sided unsupervised image-to-image translation and beat baseline methods in terms of model size and training budget. Also presented herein are embodiments of a gradient-based generative saliency methodology to interpret the translation dynamics.

20 Claims, 11 Drawing Sheets

(56) References Cited

OTHER PUBLICATIONS

Xie et al.,"Learning descriptor networks for 3D shape synthesis and analysis," In Proc. of the IEEE Conference on Computer Vision & Pattern Recognition (CVPR), 2018. (11pgs).

Xie et al."Learning energy-based spatial-temporal generative convnets for dynamic patterns," arXiv preprint arXiv:1909.11975, 2019. (15 pgs).

Xie et al.,"Generative VoxelNet: learning energy-based models for 3D shape synthesis and analysis," arXiv preprint arXiv:2012.13522, 2020. (16pgs).

Xie et al.,"Generative PointNet:energy-based learning on unordered point sets for 3D generation, reconstruction and classification," arXiv preprint arXiv:2004.01301, 2021.(10p).

Xie et al.,"Cooperative training of fast thinking initializer and slow thinking solver for conditional learning," arXiv preprint arXiv:1902.02812, 2021. (16pgs).

Xie et al.,"Learning Cycle-Consistent Cooperative Networks via Alternating MCMC Teaching for Unsupervised Cross-Domain Translation," arXiv preprint arXiv:2103.04285, 2021.(11p).

Xie et al.,"Learning energy-based model with variational autoencoder as amortized sampler," In the 35th AAAI Conference on Artificial Intelligence (AAAI), 2021. (11pgs).

Xu et al.,"Energy-based continuous inverse optimal control," arXiv preprint arXiv:1904.05453, 2019. (9pgs).

Yu et al.,"LSUN: Construction of a large-scale image dataset using deep learning with humans in the loop," arXiv preprint arXiv:1506.03365, 2016. (9pgs).

Ming-Yu Liu et al.,"Unsupervised image-to-image translation networks," In Advances in Neural Information Processing Systems (NIPS), 2017. (9pgs).

W. Liu et al.,"Energy-based out-of-distribution detection," In Annual Conference on Neural Information Processing Systems (NeurIPS), 2020. (12pgs).

Z.Liu et al.,"Deep learning face attributes in the wild," In Proceedings of the IEEE International Conference on Computer Vision (ICCV), 2015. (9pgs).

Maas et al.,"Rectifier nonlinearities improve neural network acoustic models," In ICML Workshop on Deep Learning for Audio, Speech and Language Processing, 2013. (6pgs).

Miyato et al.,"Spectral normalization for generative adversarial networks," In International Conference on Learning Representations (ICLR), 2018. (26pgs).

Nair et al.,"Rectified linear units improve restricted boltzmann machines," In Internatinal Conference on Machine Learning (ICML), 2010. (8pgs).

Radford M. Neal,"Annealed importance sampling," arXiv preprint arXiv: physics/9803008, 1998. (22pgs).

Radford M. Neal, "Mcmc using hamiltonian dynamics," arXiv preprint arXiv: 1206.1901, 2012. (51pgs).

Netzer et al.,"Reading digits in natural images with unsupervised feature learning," In NeurIPS Workshop on Deep Learning & Unsupervised Feature Learning, 2011. (9pgs).

Nijkamp et al.,"Learning non-convergent nonpersistent short-run mcmc toward energy-based model," In Advances in Neural Information Processing Systems (NeurIPS), 2019. (11pgs).

Adebayo et al.,"Sanity checks for saliency maps," arXiv preprint arXiv:1810.03292, 2018. (27pgs).

Arjovsky et al.,"Wasserstein generative adversarial networks," In International conference on machine learning (ICML), 2017. (10pgs).

Barbu et al.,"Monte Carlo Methods," Springer, 2020. (8pgs).

J. T. Barron, "Continuously differentiable exponential linear units," arXiv preprint arXiv:1704.07483, 2017.

Benaim et al.,"One-sided unsupervised domain mapping," In Advances in Neural Information Processing Systems (NIPS), 2017. (11pgs).

Bi'nkowski et al.,"Demystifying MMD GANs," In International Conference on Learning Representations (ICLR), 2018. (36pgs).

Block et al.,"Fast mixing of multi-scale langevin dynamics underthe manifold hypothesis," arXiv preprint arXiv:2006.11166, 2020. (26pgs).

Chang et al.,"Kernel stein generative modeling," arXiv preprint arXiv:2007.03074, 2020. (14pgs).

R. Chen et al.,"Residual flows for invertible generative modeling," In Advances in Neural Information Processing Systems (NeurIPS), 2019a. (11pgs).

T. Chen et al.,"Self-supervised GANs via auxiliary rotation loss," In Proceedings of the IEEE Conference on Computer Vision and Pattern Recognition (CVPR), 2019b. (10pgs).

Szegedy et al.,"Rethinkingthe inception architecture for computer vision," In Proceedings of the IEEE conference on computer vision and pattern recognition (CVPR), 2016. (9pgs).

T. Tieleman, "Training restricted Boltzmann machines using approximations to the likelihood gradient," In International Conference on Machine Learning (ICML), 2008. (8pgs).

Tran et al.,"Self-supervised GAN: Analysis and improvement with multi-class minimax game," In Advances in Neural Information Processing Systems (NeurIPS), 2019. (12pgs).

Aaron Van den Oord et al.,"Conditional image generation with pixelcnn decoders," In Advances in Neural Information Processing Systems (NIPS), 2016. (9pgs).

Wang et al.,"A fully progressive approach to single-image super-resolution," In Proceedings of the IEEE Conference on Computer Vision and Pattern Recognition (CVPR) Workshops, 2018. (11pgs).

Welling et al.,"Bayesian learning via stochastic gradient langevin dynamics," In International Conference on Machine Learning (ICML), 2011. (8pgs).

Xie et al.,"A Theory of Generative ConvNet," In International Conference on Machine Learning (ICML), 2016. (10pgs).

Xie et al.,"Synthesizing Dynamic Patterns by Spatial-Temporal Generative ConvNet," In Proc. of the IEEE Conf. on Computer Vision & Pattern Recognition (CVPR), 2017. (9pgs).

Xie et al.,"Cooperative learning of energy-based model and latent variable model via mcmc teaching," In Proc. of the AAAI Conf. on Artificial Intelligence (AAAI), 2018.(10pgs).

Odena et al.,"Conditional image synthesis with auxiliary classifier GANs," In International Conference on Machine Learning (ICML), 2017. (10 pgs).

Ostrovski et al.,"Autoregressive quantile networks for generative modeling," In International Conference on Machine Learning (ICML), 2018. (10pgs).

Pang et al.,"Learning latent space energy-based prior model," Advances in Neural Information Processing Systems (NeurIPS), 2020. (15pgs).

Park et al.,"Contrastive learning for unpaired image-to-image translation," arXiv preprint arXiv:2007.15651, 2020. (29pgs).

Radford et al.,"Unsupervised representation learning with deep convolutional generative adversarial networks," In International Conference on Learning Representations (ICLR), 2016. (16pgs).

Ramachandran et al.,"Searching for activation functions," In International Conference on Learning Representations (ICLR) Workshops, 2018. (13pgs).

Simonyan et al.,"Deep inside convolutional networks:Visualising image classification models and saliency maps," arXiv preprint arXiv:1312.6034, 2014. (8pgs).

Song et al.,"Generative modeling by estimating gradients of the data distribution," In Advances in Neural Information Processing Systems (NeurIPS), 2019. (13pgs).

Song et al.,"Improved techniques for training score-based generative models," arXiv preprint arXiv:2006.09011, 2020. (31pgs).

Grathwohl et al.,"Your classifier is secretly an energy based model & you should treat it like one," International Conference on Learning Representations (ICLR), 2020. (23pgs).

Grenander et al.,"Pattern Theory: From Representation to Inference," Oxford university press, 2007. [Abstract Only] (3 pgs).

Gulrajani et al.,"Improved training of Wasserstein GANs," In Advances in Neural Information Processing systems (NIPS), 2017. (11pgs).

Gutmann et al.,"Noise-contrastive estimation: A new estimation principlefor unnormalized statistical models," In Proceedings of the Thirteenth International Conference on Artificial Intelligence and Statistics (AISTATS), 2010. (8pgs).

Han et al.,"Divergence Triangle for Joint Training of Generator Model, Energy-based Model, and Inferential Model," In Proceedings of the IEEE Conference on: Computer Vision & Pattern Recognition (CVPR), 2019. (10pgs).

(56) References Cited

OTHER PUBLICATIONS

Hendrycks et al.,"A baseline for detecting misclassified & out-of-distribution examples in neural networks," arXiv preprint arXiv:1610.02136, 2018. (12pgs).

Hendrycks et al.,"Gaussian Error Linear Units (GELUS)," arXiv preprint arXiv:1606.08415, 2018. (9pgs).

Heusel et al.,"GANs trained by a two time-scale update rule converge to a local nash equilibrium," arXiv preprint arXiv:1706.08500, 2017. (38pgs).

Geoffrey E. Hinton, "Training products of experts by minimizing contrastive divergence," Neural Computation, 14(8):1771-1800, 2002. (19 pgs).

J. J. Hopfield, "Neural networks and physical systems with emergent collective computational abilities," Proceedings of the National Academy of Sciences (PNAS), 79(8):2554-2558, 1982. (5pgs).

Huang et al.,"Multimodal unsupervised image-to-image translation," In Proceedings of the European Conference on Computer Vision (ECCV), 2018. (18pgs).

Ingraham et al.,"Learning protein structure with a differentiable simulator," In International Conference on Learning Representations (ICLR), 2019. (24pgs).

Jin et al.,"Introspective classification with convolutional nets," In Advances in Neural Information Processing Systems (NIPS), 2017. (11pgs).

Karras et al.,"Progressive growing of GANs for improved quality, stability, and variation," In International Conference on Learning Representations (ICLR), 2018. (26pgs).

Karras et al.,"Training generative adversarial networks with limited data," Advances in Neural Information Processing Systems (NeurIPS), 2020. (11pgs).

Kim et al.,"U-gat-it: Unsupervised generative attentional networks with adaptive layer-instance normalization for image-to-image translation," In International Conference on Learning Representations (ICLR), 2020. (19pgs).

Choi et al.,StarGAN v2: Diverse image synthesis for multiple domains, In Proceedings of the IEEE Conference on Computer Vision & Pattern Recognition (CVPR), 2020. (10pgs).

Deng et al.,"Residual energybased models for text generation," In International Conference on Learning Representations (ICLR), 2020. (18pgs).

Dinh et al.,"NICE: Non-linear Independent Components Estimation," arXiv preprint arXiv:1410.8516, 2014. (12pgs).

Du et al.,"Implicit generation and modeling with energy based models," In Advances in Neural Information Processing Systems (NeurIPS), 2019. (11pgs).

Du et al.,"Energy-based models for atomic-resolution protein conformations," In International Conference on Learning Representations (ICLR), 2020. (16pgs).

Fu et al.,"Geometry-Consistent Generative Adversarial Networks for One-Sided Unsupervised Domain Mapping," In Proceedings of the IEEE Conference on Computer Vision and Pattern Recognition (CVPR), 2019. (10pgs).

Gao et al.,"Learning Generative ConvNets via Multi-grid Modeling and Sampling," In Proceedings of the IEEE Conference on Computer Vision & Pattern Recognition (CVPR), 2018. (10pgs).

Gao et al.,"Flow contrastive estimation of energy-based models," In Proceedings of the IEEE Conference on Computer Vision and Pattern Recognition (CVPR), 2020. (11 pgs).

Zhang et al.,"Consistency regularization for generative adversarial networks," In International Conference on Learning Representations (ICLR), 2020. (19pgs).

Zhao et al.,"Feature quantization improves GAN training," In International Conference on Machine Learning (ICML), 2020. (11pgs).

Zhu et al.,"Unpaired image-to-image translation using cycle-consistent adversarial networks," arXiv preprint arXiv:1703.10593, 2020. (18pgs).

Zhu et al.,"Filters, random fields and maximum entropy (FRAME): Towards a unified theory for texture modeling," International Journal of Computer Vision (IJCV), 27(2):107-126, 1998. (20pgs).

Kingma et al.,"Adam: A method for stochastic optimization," arXiv preprint arXiv:1412.6980, 2014. (9pgs).

Kingma et al.,"Auto-encoding variational bayes," arXiv preprint arXiv:1312.6114v10, 2014. (14pgs).

Kingma et al.,"Glow: Generative flow with invertible 1x1 convolutions," In Advances in Neural Information Processing Systems (NeurIPS), 2018. (10pgs).

A. Krizhevsky,"Learning multiple layers of features from tiny images," Technical report, University of Toronto, 2009. (60pgs).

Lazarow et al.,"Introspective neural networks for generative modeling," In Proceedings of the IEEE International Conference on Computer Vision (ICCV), 2017. (10pgs).

LeCun et al.,"A tutorial on energy-based learning," Predicting Structured Data, 1(0), 2006. (60pgs).

H. Lee et al.,"Diverse image-to-image translation via disentangled representations," In Proceedings of the European Conference on Computer Vision (ECCV), 2018a. (17pgs).

K Lee et al., "Wasserstein introspective neural networks," In Proceedings of the IEEE Conference on Computer Vision and Pattern Recognition (CVPR), 2018b. (10pgs).

Li et al.,"Annealed denoising score matching: Learning energy based model in high-dimensional spaces," arXiv preprint arXiv:1910.07762, 2019. (21pgs).

Jun S Liu, "Monte Carlo Strategies in Scientific Computing," Springer Science & Business Media, 2008. (14pgs).

* cited by examiner

ENERGY-BASED GENERATIVE MODELS VIA COARSE-TO-FINE EXPANDING AND SAMPLING

CROSS-REFERENCE TO RELATED APPLICATION(S)

This patent application is related to and claims priority benefit under 35 USC § 119 to commonly-owned U.S. Pat. App. No. 63/086,496, filed on 1 Oct. 2020, titled "LEARNING ENERGY-BASED GENERATIVE MODELS VIA COARSE-TO-FINE EXPANDING AND SAMPLING," and listing Jianwen Xie, Yang Zhao, and Ping Li as inventors (Docket No. 28888-2440P (BN200929USN1-Provisional)), which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to energy-based models.

B. Background

Recently, energy-based models (EBMs) parameterized by modern neural networks such as convolutional networks have attracted significant attention from the deep learning communities. Some applications with EBMs include generations of images, videos, 3D volumetric shapes, unordered point clouds, texts, molecules, etc., as well as image-to-image translation, out-of-distribution detection and inverse optimal control. EBMs are typically characterized by: (i) simplicity—the maximum likelihood learning of EBMs unifies representation and generation in a single model, and (ii) explicitness—EBMs provide an explicit density distribution of data by training an energy function that assigns lower values to observed data and higher values to unobserved ones.

However, it is not easy to train an EBM to synthesize diverse and high-fidelity images. The maximum likelihood estimation (MLE) learning process typically involves a Markov Chain Monte Carlo (MCMC) to sample from the current model and then updates the model parameters given the difference between those samples and the observed data. Such an "analysis by synthesis" learning scheme is challenging because the sampling step is inefficient and unstable to traverse different modes of the learned model, especially when the energy function is multimodal due to highly varied or high-resolution training data.

Accordingly, what is needed are improved ways to train energy-based models.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
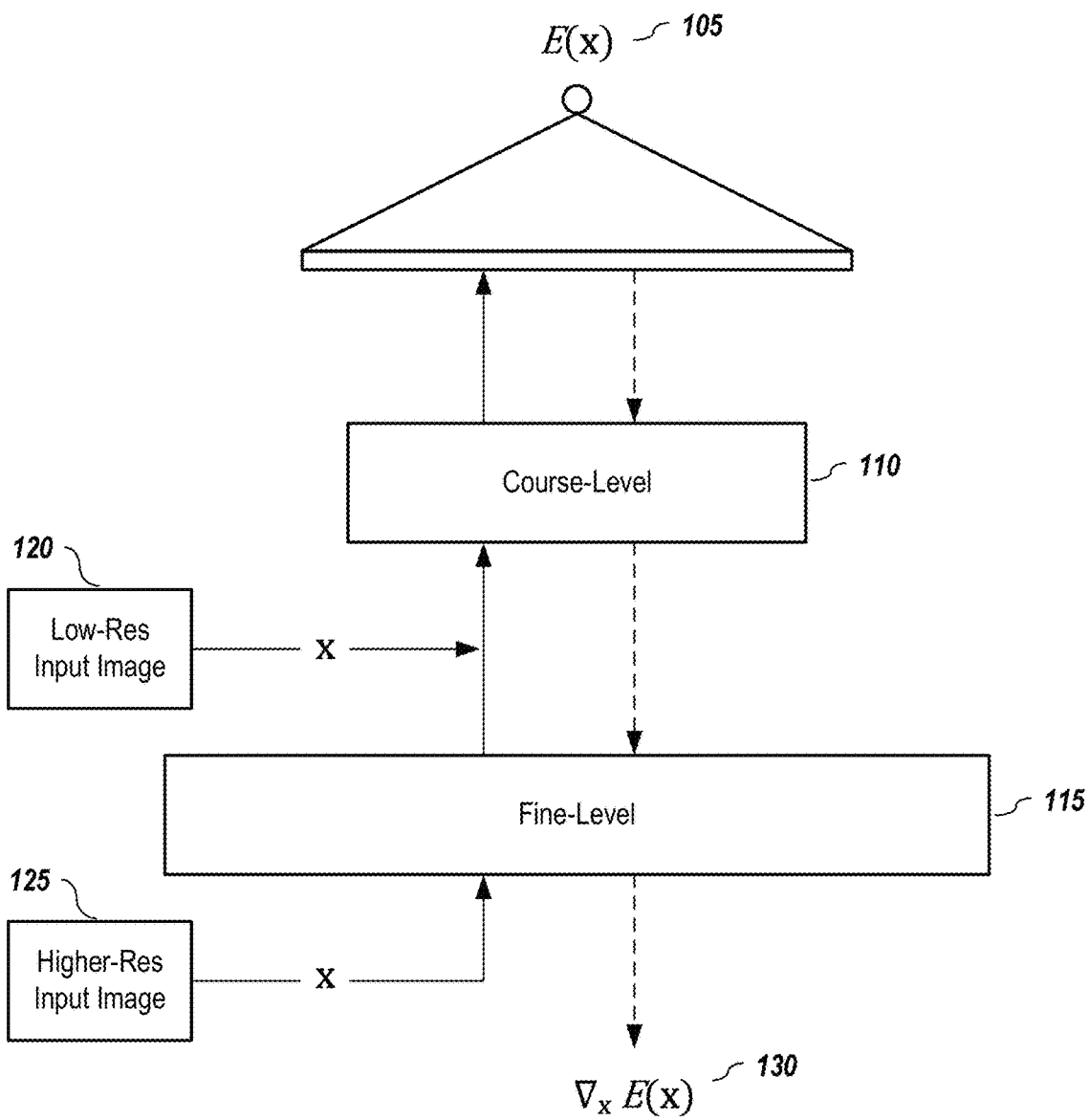
FIG. 1 depicts an embodiment of a coarse-to-fine energy-based model (EBM) with gradient-based sampling, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of image generation, aspects of the present disclosure are not so limited. Accordingly, aspects of the present disclosure may be applied or adapted for use in other contexts.

A. General Introduction

Training energy-based models to synthesize diverse and high-fidelity images has severe problems. As noted above, the "analysis by synthesis" learning scheme is challenging because the sampling step is neither efficient nor stable. In particular, when the energy function is multimodal due to the highly varied or high-resolution training data, it is not easy for the MCMC chains to traverse the modes of the learned model. However, it is known that the manifold residing in a downsampled low-dimensional image space is smoother than that in the original high-dimensional counterpart. Thus, learning an EBM from low-dimensional data is much stabler and faster than learning from high-dimensional data in terms of convergence.

Presented herein are embodiments of a multistage coarse-to-fine energy-based modeling and sampling methodology and embodiments of methods for training such models; embodiments of such may be referred to generally, for convenience, as CF-EBM.

FIG. 1 graphically illustrates a coarse-to-fine EBM with gradient-based MCMC sampling, according to embodiments of the present disclosure. As presented in FIG. 1, embodiments start with learning a coarse-level EBM on easier low-resolution images and then smoothly transits to learn the finer-level EBM by adding new layers that take into account the higher-resolution information as the learning progresses. The gradient-based short-run MCMC, e.g., Langevin dynamics, may be used for efficient sampling. From the modeling aspect, the coarse-level training can be useful for exploring the global structure of image, while the fine-level training will then gradually refine the image details. Some recent works have demonstrated the advantages of this incremental learning. However, there have been no works focusing on the incremental learning of EBMs that incorporates bottom-up representation and top-down sampling in a single net. Besides, as shown in FIG. 1, the top-down gradient information 130 for synthesis flows (dashed lines) from coarse-level layers (e.g., 110) towards fine-level layers (e.g., 115). Thus, during the coarse-to-fine expanding, embodiments may use the coarse-level synthesis to help the fine-level synthesis to stabilize the sampling. The top-down gradient information $\nabla_x E(x)$ 130 flow may be treated as mapping a less multi-modal low-dimensional latent "prior" to a high-dimensional target by adding more delicate details, as illustrated in FIG. 1. Embodiments of the methodology are thus less sensitive to the multi-modal manifold structure embedded in high-dimensional ambient space. Also, such a coarse-to-fine expanding and sampling scheme is useful for high-fidelity synthesis in several vision tasks.

Furthermore, presented herein are embodiments of a one-sided energy-based unsupervised image-to-image translation methodology, which may be scaled up to high resolution. In one or more embodiments, this methodology is immediately available with a CF-EBM embodiment by using its iterative Langevin dynamics without the need of the cycle consistency or geometry constraints. Specifically, embodiments may learn an EBM of target domain with Langevin dynamics initialized by the examples from source domain. In one or more embodiments, the resulting translator is the short-run MCMC. Compared with prior works that learn black-box encoder-decoder networks between domains, embodiments herein are much more interpretable in the sense that they may be explained by a visualization method that uses gradients to visualize the most essential regions, i.e., the generative saliency, when translating an image from the source domain to the target domain.

Some of the contributions provided by embodiments herein include, but are not limited to, the following:

To the best of the knowledge of the inventors, this is the first work that trains EBMs under an "analysis by synthesis" scheme via a multistage coarse-to-fine expanding and sampling strategy. Also, presented herein are several techniques for improving EBM, e.g., smooth activations. Particularly, embodiments were the first to train a pure EBM for synthesizing 512×512 images.

Presented herein are embodiments of a novel energy-based unsupervised image-to-image translation approach, which is essentially different from all other existing generative adversarial network (GAN)-based approaches. Noticeable results were demonstrated in terms of both translation quality and efficiency of time and memory.

Extensive experiments were conducted to validate embodiments and various applications, including image generation, denoising, inpainting, out-of-distribution detection, and unsupervised image translation. Strong results show that the embodiments outperform or are competitive with prior approaches.

B. Related Work

1. Energy-Based Generative Models

One of the main challenges to training EBMs via maximum likelihood estimation (MLE) lies in drawing fair samples from the model, especially when the energy function is parameterized by a highly non-linear convolutional neural network (CNN or ConvNet). The contrastive divergence (CD), with MCMC chains initialized from data distribution, may be an efficient way to train EBMs, but it is biased. Another suggested direction is to adopt the idea of energy-based correction of a more tractable model to train EBMs. Noise contrastive estimation (NCE) and introspective neural networks (INNs) belong to this theme. Generative cooperative networks (CoopNets) attempt to train an EBM with a generator or a variational auto-encoder (VAE) as amortized sampler by MCMC teaching. Triangle divergence seeks to train an EBM without MCMC by amortizing the MCMC via a VAE. However, these frameworks still struggle to scale up and model multimodal data. There have been several strategies to improve the EBM training. Gao et al. (2018) (Ruiqi Gao, Yang Lu, Junpei Zhou, Song-Chun Zhu, and Ying NianWu. Learning Generative ConvNets via Multi-Grid Modeling and Sampling. In *Proceedings of the IEEE Conference on Computer Vision and Pattern Recognition (CVPR)*, pp. 9155-9164, 2018, which is incorporated by reference herein in its entirety) adopts a multi-grid method that trains multiple EBMs at different grids simultaneously, where the EBM at coarser grid is used to initialize the image generation by EBM at finer grid. However, optimizing and sampling from multiple EBMs will result in low efficiency of both time and memory. To stabilize the training, others attempted to add Gaussian white noise to the observed data, resulting in noisy synthesized images. In contrast, in one or more embodiments, a single EBM is trained via a coarse-to-fine growing strategy. Also, embodiment may also employ some improved techniques, which are discussed below. With smooth parameter training and image sampling, embodiments can preserve EBM's compatibility and synthesize high-fidelity images.

Some other works aim to improve score-based generative models. Although they are not categorized into EBMs, Langevin dynamics are used for sampling such that the proposed techniques are potentially useful. For example, Block et al. (Adam Block, Youssef Mroueh, Alexander Rakhlin, and Jerret Ross. Fast Mixing Of Multi-Scale Langevin Dynamics Under the Manifold Hypothesis. arXiv preprint *arXiv:*2006.11166, 2020, which is incorporated by reference herein in its entirety) proposed mr-Langevin that applies a multi-resolution Langevin dynamics to help ameliorate the slow mixing issues using a pretrained super-resolution network is adopted. Song & Ermon (Yang Song and Stefano Ermon. Improved techniques for training score-based generative models. arXiv preprint *arXiv:*2006.09011, 2020, which is incorporated by reference herein in its entirety) proposed applying an exponential moving average to parameters when sampling. However, these techniques still struggle to scale up and model multimodal data. Even worse, to stabilize the training, the Gaussian noise is always added to the observed data, resulting in both a high variance learning and noisy synthesized samples. In contrast, embodiments comprise a new neural architecture with improved techniques. Embodiments of the learned model can preserve the compatibility of EBM and synthesize high-fidelity images.

2. Unsupervised Image-to-Image Translation

GAN-based solution. Image-to-image translation aims to learn directions of mapping (i.e., F: X→Y and G: Y→X) between two unpaired domains. Recent successes are based on adversarial learning, e.g., CycleGAN, UNIT, MUNIT, DRIT, and U-GAT-IT. These methods typically train two GANs with two levels of learning objectives: (i) Distribution level: two adversarial losses are used to capture style discrepancy between source and target domain; and (ii) Instance level: to tackle the difficulty of unpaired setting, they adopt a cycle consistency loss for content preservation. This loss enables an instance-level supervision to regularize the training of two mappings by enforcing them to be a bijective function between two domains. One of the significant limitations of this line of works is the mutual correlation between F and G since they are optimized simultaneously towards being roughly invertible of each other. To some extent, it may intensify the long-standing instability issues of GAN and increase training time cost. They also require an elegant design, e.g., instance normalization, positional normalization, and attention mechanism, and a largescale architecture is used to ensure the model explores the inherent discrepancy between two domains and preserve source contents in translation. Some efforts on research about one-sided unsupervised image translation have also been made, e.g., DistanceGAN, GcGAN, and CUT, which apply geometric or contrastive constraints. Embodiments herein solve this problem from the perspective of EBM, which is different from GAN-based methods. The concise EBM solution embodiments herein utilize its built-in objective, which is a distribution-level statistics matching, to accomplish the one-sided image translation. It transfers the style and preserves the source content by MCMC without using the cycle-consistency loss. Embodiments demonstrate better performances with less time and memory. Another distinction between method embodiments of the present patent document and GAN-based methods is the natural interpretability of Langevin dynamics. It provides a gradient-based saliency map to visualize those key regions that make the two domains distinct.

C. Methodology Embodiments

In this section, embodiments of an EBM learning framework are presented, and then embodiments of the CF-EBM approach are described. After that, it is shown how a model embodiment may be generalized for the task of unsupervised image-to-image translation.

1. MCMC-Based Maximum Likelihood Learning of Energy-Based Model Embodiments

Let $x \in \mathbb{R}^D$ be the observed example, e.g., an image. An energy-based model may be defined as follows:

$$p_\theta(x) = \frac{1}{Z(\theta)} \exp(-E_\theta(x)) \quad (1)$$

where $E_\theta(x): \mathbb{R}^D \to \mathbb{R}$ is the energy function defined by a bottom-up ConvNet whose parameters are denoted by $\theta$. $Z(\theta) = \int \exp(-E_\theta(x))dx$ is the intractable normalizing constant or the partition function. Given N observed data points $\{x_i\}_{i=1}^N \sim p_{data}(x)$, where $p_{data}(x)$ is the unknown data distribution, the model may be trained by maximizing the log-likelihood $$L(\theta) = \frac{1}{N} \sum_{i=1}^N \log p_\theta(x_i) \approx \mathbb{E}_{x \sim p_{data}} \log(p_\theta(x)).$$

The derivative of the negative log-likelihood is given by:

$$-\nabla_\theta L(\theta) = \mathbb{E}_{x \sim p_{data}(x)}[\nabla_\theta E_\theta(x)] - \mathbb{E}_{\tilde{x} \sim p_\theta(x)}[\nabla_\theta E_\theta(\tilde{x})], \quad (22)$$

where the second expectation term under $p_\theta(x)$ is intractable and may be approximated via MCMC. Given that, the EBM may be updated by gradient descent. In one or more embodiments, to sample $\tilde{x} \sim p_\theta(x)$ via MCMC, gradient-based Langevin dynamics that recursively computes the following step may be used:

$$\tilde{x}_{t+1} = \tilde{x}_t - \frac{\eta_t}{2} \nabla_{\tilde{x}} E_\theta(\tilde{x}_t) + \sqrt{\eta_t} \epsilon_t, \; \epsilon_t \sim \mathcal{N}(0, I), \quad (3)$$

where $\eta_t$ is the step size of the Langevin step and also the variance of Gaussian noise $\epsilon_t$. Theoretically, to ensure convergence, the MCMC is typically performed with infinite steps and an infinitesimal stepsize. However, it is impractical for training EBMs. In one or more embodiments, short-run MCMC may be used, which starts from a fixed noise distribution and runs a fixed number T of Langevin steps in both training and testing stages. The training with a short-run MCMC might result in a biased estimation of EBM, but the learned short-run MCMC is still a valid generator, which enables embodiments to synthesize realistic images and efficiently trains the model. In one or more embodiments, the step size is kept constant and linearly decay the noise variance till 0; however, it should be noted that different approaches, different values, or both may be used.

2. CF-EBM: Coarse-to-Fine EBM Learning Embodiments

Figure 2:
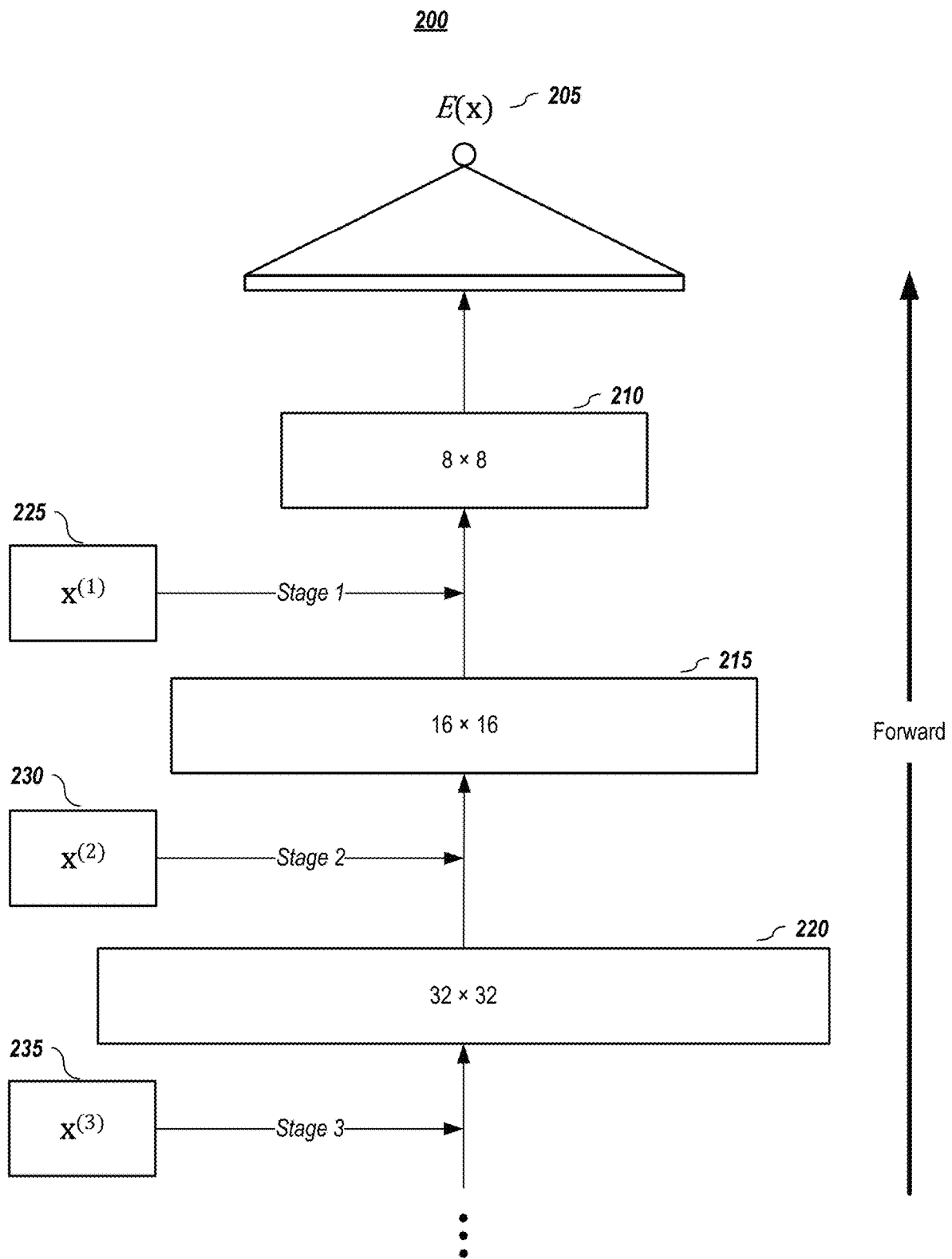
FIG. 2 illustrates a multistage coarse-to-fine EBM training strategy, according to embodiments of the present disclosure.

One of the significant contributions herein is the multi-stage coarse-to-fine expanding and sampling methodology for training EBMs. A key concept is to incrementally grow the EBM from a low resolution (coarse model) to a high resolution (fine model) by gradually adding new layers to the energy function. In this way, both stability and time efficiency in training EBMs benefit. And eventually, in one or more embodiments, the EBM at the highest resolution is kept for image generation using the short-run MCMC sampling. FIG. 2 illustrates a multistage coarse-to-fine EBM training strategy, according to embodiments of the present disclosure. Methodology 1 also depicts a pseudocode implementation of an embodiment of a multistage coarse-to-fine EBM training strategy.

---

Methodology 1: CF-EBM Training Embodiment

Input: Multi-resolution data $\{x_i^{(s)}, i = 1, \ldots, N; s = 1, \ldots, S\}$, numbers of Langevin steps $\{T^{(s)}\}_{s=1}^S$, and batch sizes $\{n^{(s)}\}_{s=1}^S$
Output: Energy function $E^{(S)}$
$E^{(0)} \leftarrow \emptyset$
for s = 1 : S do
    m = 0, $\beta$ = 0
    Expand model: $E^{(s)} \leftarrow E^{(s-1)} + \text{Expand}(.)$
    while (m $\leq$ N) do
        # Draw real data and initial MCMC samples Draw observed $\{x_i^{(s)}\}_{i=1}^{n^{(s)}} \sim p_{data}(x)$ Draw initial $\{\tilde{x}_i^{(s)}\}_{i=1}^{n^{(s)}} \sim \mathcal{U}^{(s)}(-1, 1)$

Smooth MCMC sampling
        if $\beta$ < 1 and s > 1 then

Draw initial $\{\tilde{x}_i^{(s-1)}\}_{i=1}^{n^{(s)}} \sim \mathcal{U}^{(s-1)}(-1, 1)$ Update $\{\tilde{x}_i^{(s-1)}\}_{i=1}^{n^{(s)}}$ for $T^{(s-1)}(1-\beta)$ steps of Eq. (3) with $E^{(s-1)}$ $\tilde{x}_i^{(s)} \leftarrow \sqrt{1-\beta^2} \, \text{Upsample}(\tilde{x}_i^{(s-1)}) + \beta \tilde{x}_i^{(s)}$ Methodology 1: CF-EBM Training Embodiment

```
    end
    Update {x̄_i^(s)}_{i=1}^{n^(s)} for T^(s) steps of Eq. (3) with E^(s)
    # Optimize the Energy function
    Update E^(s) with gradient descent in Eq. (2)
    m ← m + n^(s)
    β = max(1, 2N/n^(s))
  end
end
```

For sake of illustration, let S denote the total number of training stages and $(x^{(s)}, s=1, \ldots, S)$ denote the multi-resolution versions of an image x, with $x^{(1)}$ being the minimal resolution version of x, and $x^{(S)}=x$. For example, as illustrated in FIG. 2, there are increasing resolutions of an input image, $x^{(1)}$ 225, $x^{(2)}$ 230, and $x^{(3)}$ 235. For each $x^{(s)}$, $x^{(s-1)}$ may be easily generated by average pooling with a pooling size. At stage s, a model is associated with an energy function $E^{(s)}$ to learn from $x^{(s)}$. In one or more embodiments, the model 205 starts from an initial minimal resolution at stage 1. When the training proceeds to the next stage s+1, randomly initialized layers may be added at the bottom to expand the resolution and obtain a new energy function $E^{(s+1)}$. For example, in FIG. 2, when the training stage switches from stage 2 to 3, $E^{(2)}$, which is an energy function of resolution 16×16 (215), by adding a bottom block accounting for resolution 32×32 (220) to get $E^{(3)}$. After that, in one or more embodiments, just $E^{(3)}$ at stage 3 needs to be trained.

Compared with PGAN, which proposes a progressive growing strategy to train GAN, CF-EBM embodiments integrate both the learning (Eq. (2)) and the sampling (Eq. (3)) into a single neural network $E_\theta(x)$, which is fundamentally and functionally different from PGAN that applies a discriminator to guide the learning and a generator to produce samples. Therefore, training an EBM via a multi-stage growing strategy may be considered as being more challenging and non-trivial. With the newly expanded energy function $E^{(s+1)}$ and the enlarged training examples $x^{(s+1)}$, the stage transition should be taken care of to avoid instability issue. In one or more embodiments, CF-EBM embodiments deals with this issue from the following two aspects:

a) Smooth EBM Learning Embodiments

Let Expand(•) denote an expanding block. In one or more embodiments, to expand the resolution of the EBM at each stage, an Expand(•) may be added to the bottom of the energy function to increase its resolution. Embodiments herein double its resolution, but other increases may be used. The block may be smoothly faded to prevent sudden shocks to the well-trained coarse-level energy function. Specifically, in one or more embodiments, Expand(•) is a composition of a primal block Primal(•) and a fading block Fade(•). In one or more embodiments, Expand(x) is defined as Expand(x)=βPrimal(x)+(1-β)Fade(x), where β is a fading factor that gradually increases from 0 to 1 as more data are consumed in the training. As a result, the model first relies on the well-trained coarse-level layers and gradually shifts the attention to the newly added fine-level layers. In one or more embodiments, the auxiliary fading block may be abandoned when β reaches 1. In one or more embodiments, Primal (•) comprises two convolution layers, and Fade(•) comprises a convolution layer followed by a 2×2 average pooling to link the previous coarse-level layers.

b) Smooth MCMC Sampling Embodiments

In one or more embodiments, smooth sampling may be realized implicitly, explicitly, or both.

(i) Implicitly Smoothing Embodiments

Considering the resolution transition from stage s−1 to stage s, the energy function may be expanded by $E^{(s)}(x^{(s)})=E^{(s-1)}(\text{Expand}(x^{(s)}))$. The gradient $\nabla_{x^{(s)}}E^{(s)}(x^{(s)})$ for Langevin sampling in Eq. (3) may be unfolded as:

$$\nabla_{\text{Expand}(x^{(s)})}E^{(s-1)}(\text{Expand}(x^{(s)})) \times$$
$$[\beta\nabla_{x^{(s)}}\text{Primal}(x^{(s)}) + (1-\beta)\nabla_{x^{(s)}}\text{Fade}(x^{(s)})].$$

Initially, because the fading factor β is small, the newly added primal block Primal(•), whose weights may be randomly initialized, would not largely affect the sampling immediately. In one or more embodiments, only the coarse-level function $E^{(s-1)}$ and the auxiliary fading block Fade(•) make major contributions to the image synthesis. As β increases, the Primal($x^{(s)}$) becomes increasingly well-trained. Meanwhile, the term $\nabla_{x^{(s)}}\text{Fade}(x^{(s)})$ fades away and $\nabla_{x^{(s)}}\text{Primal}(x^{(s)})$ gradually takes the lead in the sampling, thus the synthesized images would become sharper and sharper.

(ii) Explicitly Smoothing Embodiments

Figure 3:
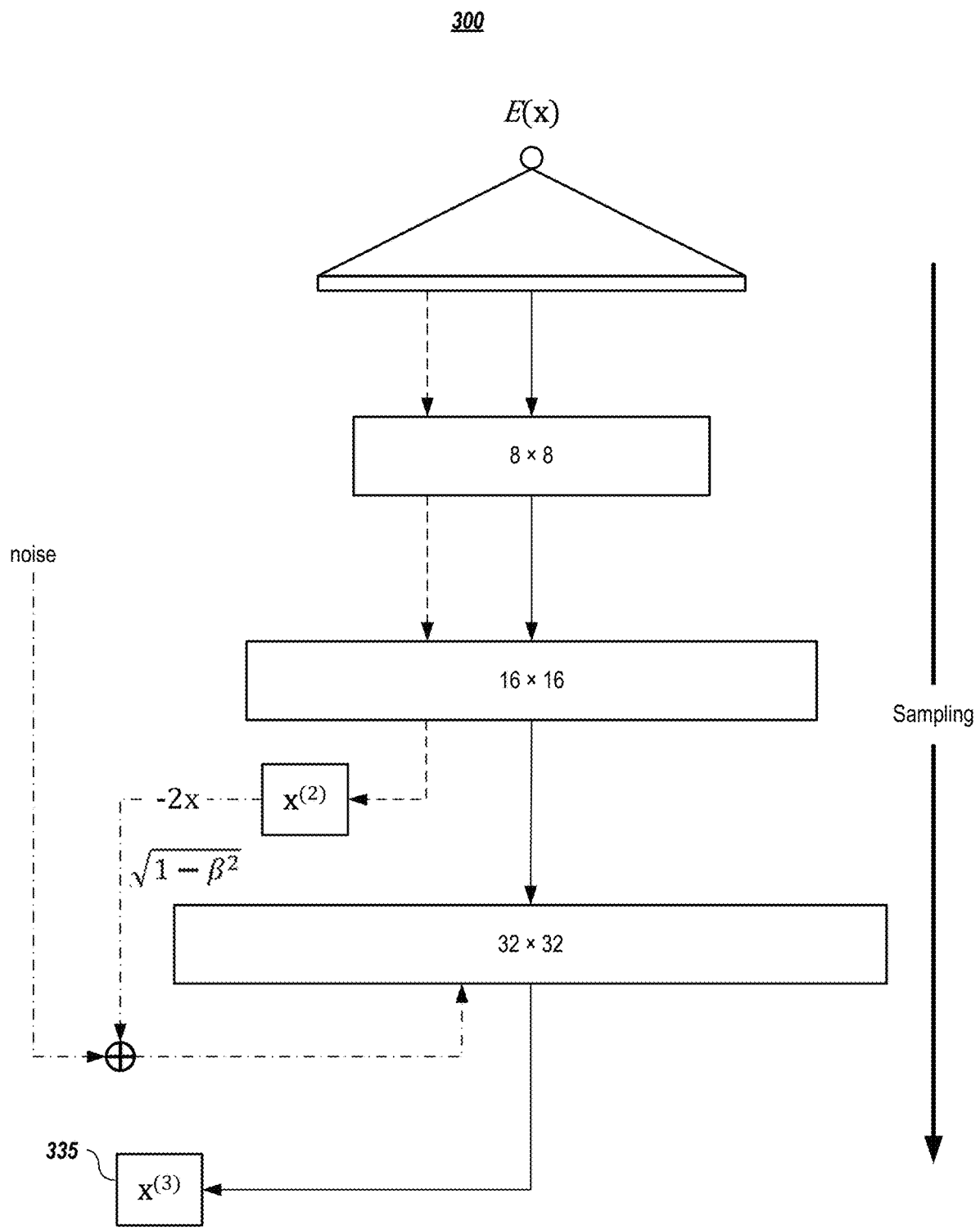
FIG. 3 graphically illustrates a smooth sampling process, according to embodiments of the present disclosure.

In one or more embodiments, to mitigate the impact of the sudden model expansion on sampling, the well-trained coarse model $E^{(s-1)}$ may be utilized to initialize the MCMC sampling of the newly expanded model $E^{(s)}$. Specifically, in one or more embodiments, at stage s, embodiments first generate low resolution samples from $E^{(s-1)}$ by running $T^{(s-1)}(1-\beta)$ Langevin steps. Those samples may then be upsampled (e.g., 2×) by Upsample(•) and mixed with a uniform noise to initialize the MCMC sampling of $E^{(s)}$. As the fading factor β increases, such an MCMC initialization assistance from the coarse model fades away. Eventually, when β reaches 1, $E^{(s)}$ may be directly sampled from with a purely noise-initialized MCMC. FIG. 3 illustrates the smooth sampling process at stage 3, according to embodiments of the present disclosure.

In one or more embodiments, different numbers of Langevin steps may be used at different stages, although the same number of Langevin steps may be used for two or more stages. For example, embodiments run MCMC with $T^{(1)}=15$ steps at stage 1, and gradually increase the number of steps as the model grows. In the test embodiments, a maximal number of steps was set at 60, although a different maximum may be used.

c) Alternative Method Embodiments

Figure 4:
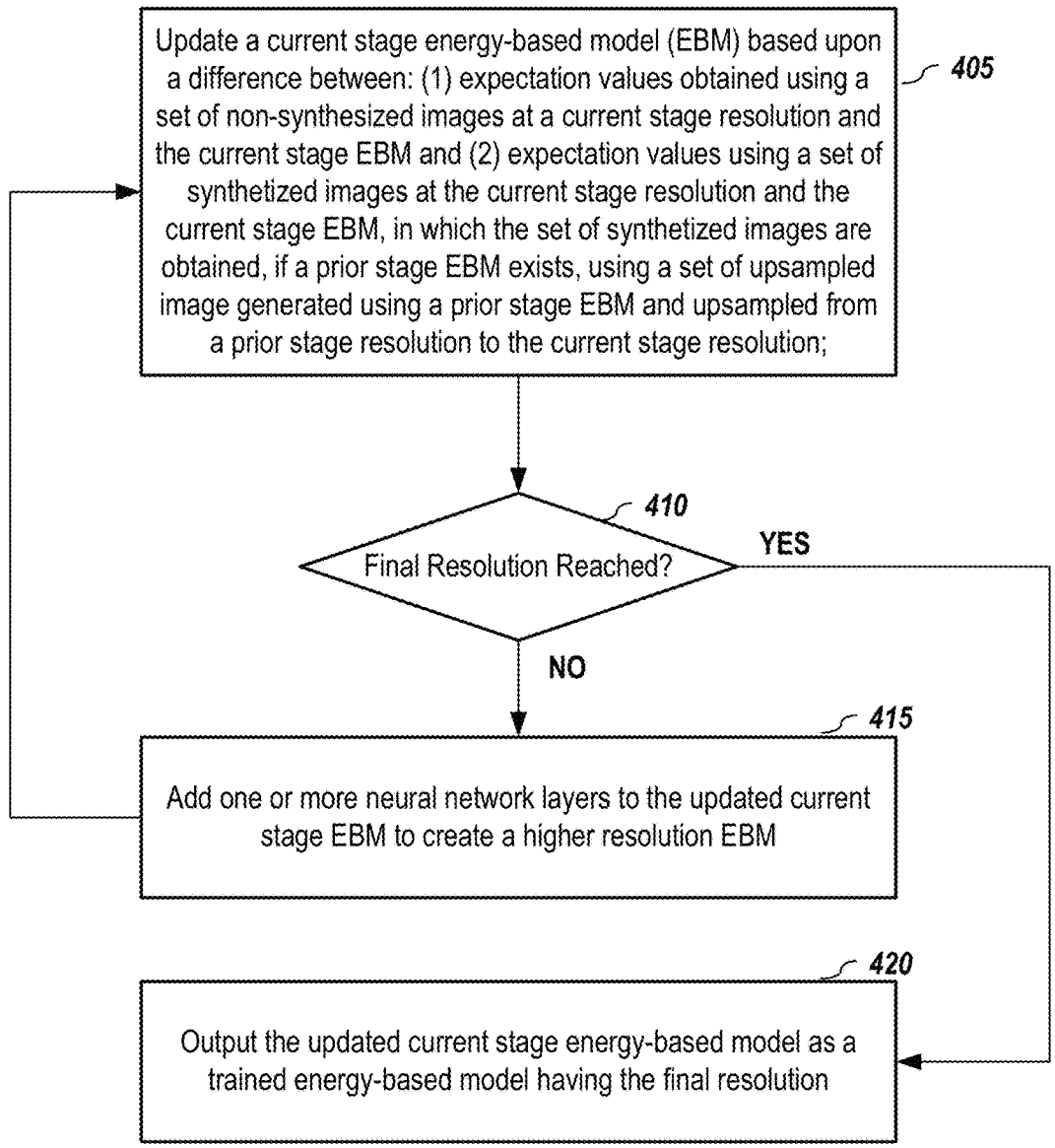
FIG. 4 depicts a computer-implemented method for training an energy-based model, according to embodiments of the present disclosure.

FIG. 4 depicts a computer-implemented method for training an energy-based model, according to embodiments of the present disclosure. Embodiments involve a multistage coarse-to-fine expanding and sampling strategy, in which training starts with a minimal resolution energy-based model and successively increases model resolution capability through stages until a final resolution capability for the energy-based is reached. In one or more embodiments, each stage comprises updating (405) a current stage energy-based model based upon a difference between: (1) expectation values obtained using a set of non-synthesized images at a current stage resolution and the current stage energy-based model, and (2) expectation values using a set of synthesized images at the current stage resolution and the current stage energy-based model.

Responsive to the current stage energy-based model not having (410) the final resolution capability, one or more neural network layers are added (415) to the updated current stage energy-based model to create a higher resolution energy-based model for a next stage. This higher resolution energy-based model is set as the current stage energy-based model for a next iteration, and the process returns to the step of updating (405) a current stage energy-based model for the next iteration.

In one or more embodiments, responsive to the current stage energy-based model having the final resolution capability, the updated current stage energy-based model may then be output (420) as a trained energy-based model having the final resolution.

In one or more embodiments, the set of synthesized images are obtained, if a prior stage energy-based model exists, using a set of upsampled image generated using the prior stage energy-based model that have been upsampled from a prior stage resolution to the current stage resolution.

If it is the first iteration, there is not a prior stage model. Thus, in one or more embodiments, the set of non-synthesized images having the current stage resolution may be obtained by sampling from a set of real images. And, the set of synthesized images having the current stage resolution may be obtained by: generating an initial set of current stage synthesized images having the current stage resolution by sampling from a distribution (e.g., a uniform distribution); and generating, via Markov chain Monte Carlo (MCMC) sampling, the set of synthesized images given the initial set of synthesized images and the current stage energy-based model that has an input at the current stage resolution.

In one or more embodiments, the computer-implemented method may comprise obtaining the various images. For example, in one or more embodiments, the set of non-synthesized images at the current stage resolution may be obtained by sampling from a set of real images. And, the set of synthesized images at the current stage resolution may be obtained by performing steps comprising: generating an initial set of current stage synthesized images having the current stage resolution by sampling from a distribution; generating an initial set of prior stage synthesized images having a prior stage resolution by sampling from a distribution; generating, via Markov chain Monte Carlo (MCMC) sampling, a set of updated prior stage synthesized images given the initial set of prior stage synthesized images and a prior stage energy-based model that has an input at the prior stage resolution; generating a set of smoothed synthesized images at the current stage resolutions by combining the initial set of current stage synthesized images with the set of updated prior stage synthesized images that have been upsampled to the current stage resolution; and generating, via Markov chain Monte Carlo (MCMC) sampling, the set of synthesized images given the set of smoothed synthesized images and the current stage energy-based model that has an input at the current stage resolution.

In one or more embodiments, the step of obtaining the set of non-synthesized images at the current stage resolution by sampling from a set of training images having the final resolution. If the current stage resolution is not the final resolution, training images from the set of training images may downsampled to the current stage resolution and the images may be sampled from the downsampled training images to obtain the set of real images having the current stage resolution. It shall be noted that the order is not required; that is, the images may first be selected and then downsampled to the appropriate resolution. If the current stage resolution is the final resolution, sampling may be performed directly from the set of training images to obtain the set of real images because the images are at the correct resolution.

In one or more embodiments, the step of adding one or more neural network layers to the updated current stage energy-based model to create a higher resolution energy-based model for a next stage may comprise removing a red-green-blue (RGB) block that transforms a 3-channel RGB image to a z-channel feature map, where z is number of channels of each kernel at a bottom convolutional layer of the updated current stage energy-based model and that has the current stage resolution; and adding an expanding block and a new RGB block that each have the higher resolution.

In one or more embodiments, an expanding block may comprise a primal block comprising two convolutional layers, wherein the first convolutional layer does not change a spatial size and the second convolutional layer has a stride for down-sampling, and a fading block comprising a convolution layer followed by an average pooling to link previous coarse-level layers.

Given a trained energy-based model having the final resolution, it may be used to generate a synthesized image at the final resolution. For example, a methodology, such as that described below with respect to Methodology 2 may be used to generate image. It shall be noted that, as explained in more detail below, that the trained energy-based model may be trained for a one domain that is different from input images, and the step of using the trained energy-based model having the final resolution to generate a synthesized image at the final resolution may involve generating a synthesized image at the final resolution that represents an image-to-image translation.

3. Example Architecture Design Embodiment

By way of illustration, a neural network architecture of an energy function for the model at 256×256 resolution is given below in Table 1. This neural network architecture was used for experiments, which are discussed in more detail in Section D.

TABLE 1

The neural network architecture for energy function at resolution 256 × 256.

| Block Type | Output shape |
| --- | --- |
| Flatten & Linear | 1 |
| Primal | 4c × 1 × 1 |

TABLE 1-continued

The neural network architecture for energy function at resolution 256 × 256.

| Block Type | Output shape |
|---|---|
| Primal | 4c × 4 × 4 |
| Primal | 4c × 8 × 8 |
| Primal | 4c × 16 × 16 |
| Primal | 4c × 32 × 32 |
| Primal | 2c × 64 × 64 |
| Primal | c × 128 × 128 |
| FromRGB | c/2 × 256 × 256 |
| RGB image x ∈ $\mathbb{R}^{3 \times 256 \times 256}$ | 3 × 256 × 256 | c is a channel multiplier. For experiments herein, c was set as c = 32 for all experiments, although other values may be used.

In this embodiment, each expanding block Expand(•) comprises a primal block Primal(•) and a fading block Fade(•). The Primal(•) comprises two convolutional layers, where the first layer does not change the spatial size whereas the second one comes with a stride of 2 for down-sampling. The kernel size is 3×3. The top Primal(•) (without down-sampling) uses kernel size 3×3 for the first layer and kernel size 4×4 for the second layer. This embodiment also has a residual connection in Primal(•), which is a single convolutional layer followed by an average pooling of size 2×2. In this embodiment, the residual connection was not applied in the last Primal(•) block. FromRGB(•) is a special block that transforms a 3-channel RGB (red-green-blue) image to a z-channel feature map, where z is the number of channels of each kernel at the bottom convolutional layer, in order to connect the input image to the bottom layer of the energy function. An illustration of an embodiment of the expansion process from resolution 16×16 to 32×32 is provided in FIG. 5.

Figure 5:
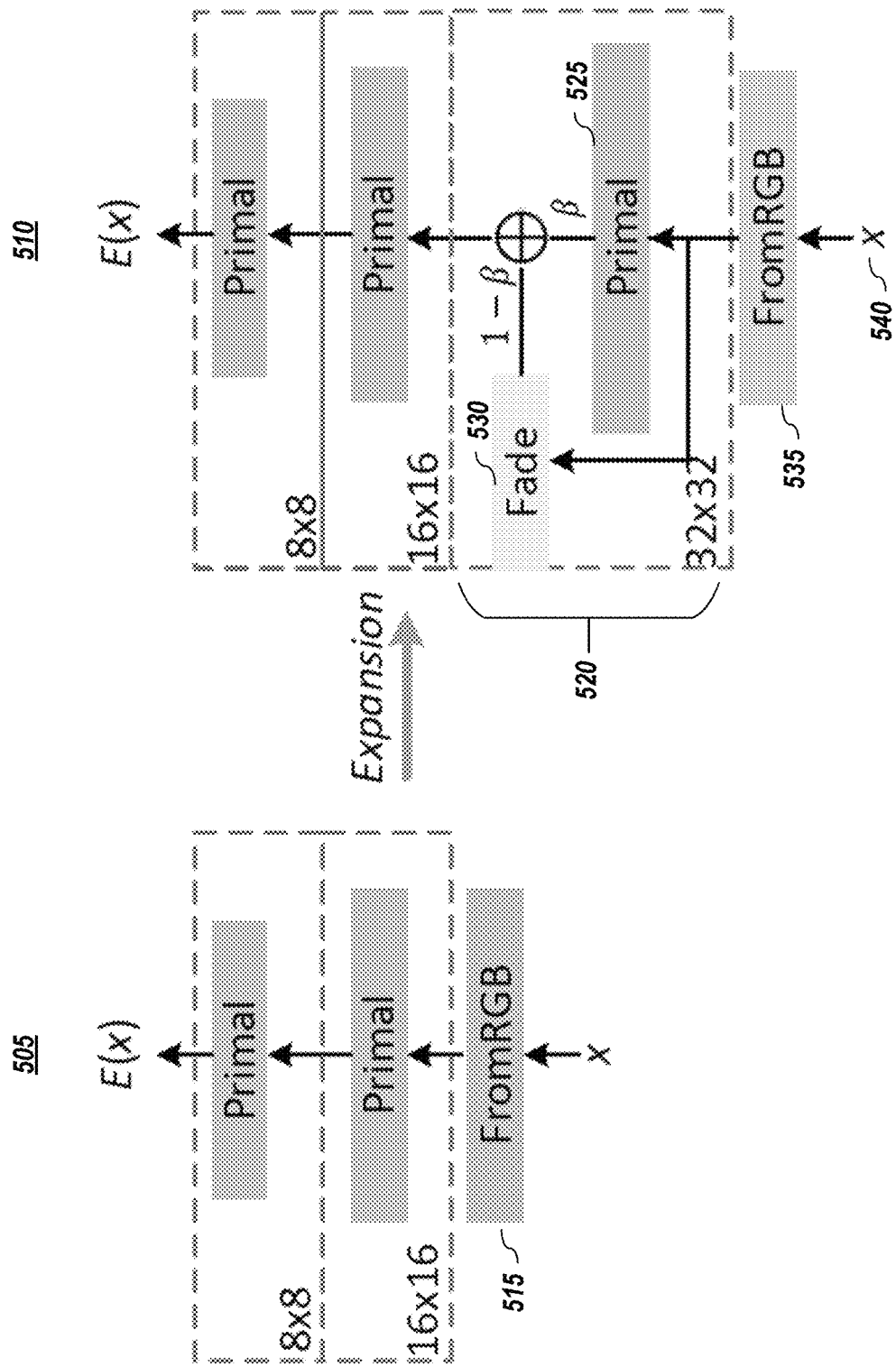
FIG. 5 graphically depicts the expansion of resolution for an energy-based model, according to embodiments of the present disclosure.

FIG. 5 graphically depicts the expansion from resolution 16×16 to 32×32, according to embodiments of the present disclosure. The FromRGB(•) block 515 at the bottom of the energy function 505 at resolution 16×16 is removed, and then an expanding block 520, which comprises a Primal block 525 and a Fading block 530, and a new FromRGB(•) block 535, which is used to connect the input RGB image 540 to the newly added Primal block 525, are added.

4. Embodiments of Using a Trained EBM

After the training, a target EBM, $E^{(s)}$, is obtained. An example sampling procedure by a learned model is presented in Methodology 2, below.

---
Methodology 2: CF-EMB Sample Embodiment
---
Input: model $E^{(s)}$, $T^{(s)}$ steps
Output: sample $\tilde{x}^{(s)}$
    Draw initial $\tilde{x}^{(s)} \sim \mathcal{U}^{(s)}(-1, 1)$
    for t = 1: $T^{(s)}$ do
        Update $\tilde{x}^{(s)}$ by using Eq. (3)
    end
---

In one or more embodiments, the MCMC starts from a uniform noise distribution and then runs $T^{(S)}$ steps of Langevin updates to generate samples. Note that, in one or more embodiments, both the initial distribution and the number of Langevin steps are the same in both training and sampling. If one runs MCMC with more steps than that used at the training stage, the oversaturation phenomenon may occur.

Figure 6:
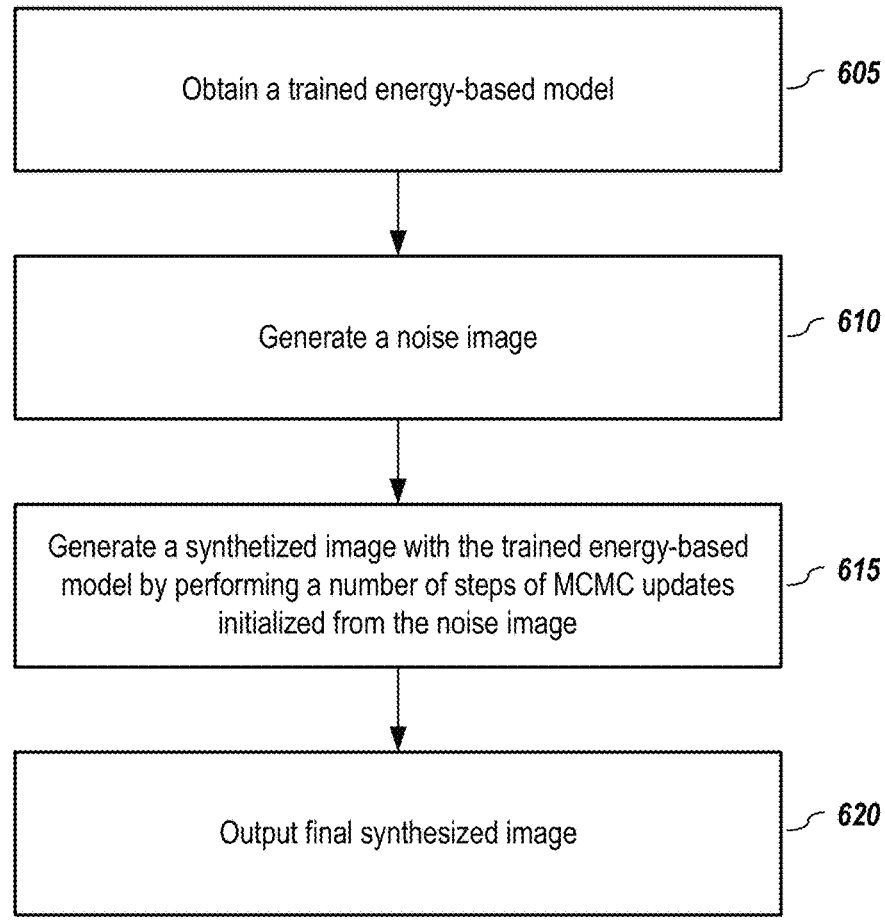
FIG. 6 depicts a method for generating an image using a trained energy-based model, according to embodiments of the present disclosure.

FIG. 6 depicts a method for generating an image using a trained EBM, according to embodiments of the present disclosure. As illustrated, one obtains (605) a trained EBM, such as described herein using a multistage training process, and one or more input samples are also obtained (610). In one or more embodiments, the input sample (e.g., an image) may be sampled from a distribution, which may be a uniform distribution. Alternatively, the input sample may be one based upon the intended use of the EMB. For example, for image-to-image translation (which is explained in more detail in the next section), the input sample (e.g., an image) may be from a source domain, and the output image will be in the target domain.

Given the trained EBM and the input sample, a synthesized image may be generated (615) by performing a number of steps of MCMC updates. Once the number of steps have been completed, the synthesized image may be output (620).

As will be described below, a trained EBM may be used for numerous applications, including but not limited to image generation, image restoration (inpainting and denoising), and out-of-distribution (OOD) and, as explained in the next section, it may be used for unpaired image-to-image translation.

5. Energy-Based Unsupervised Image-to-Image Translation Embodiments

Figure 7:
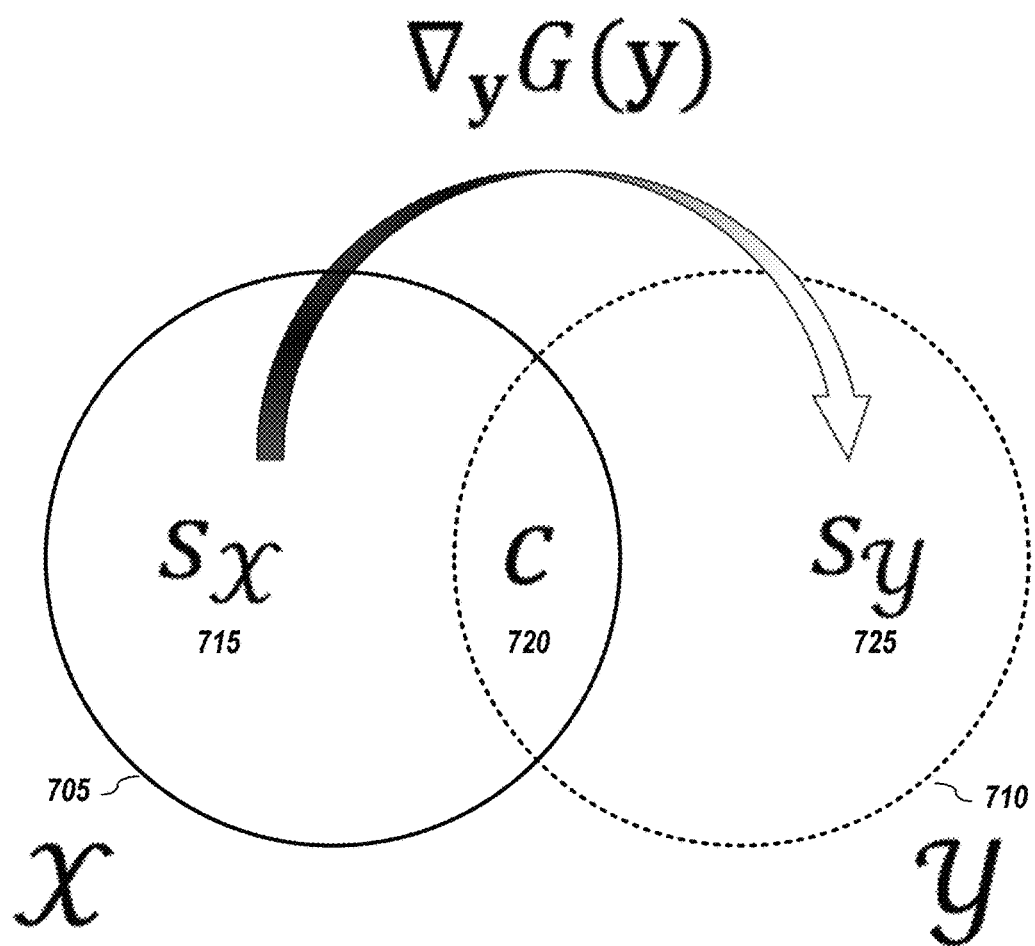
FIG. 7 graphical depicts image translation, according to embodiments of the present disclosure.

In one or more embodiments, an embodiment was generalized on the unpaired image-to-image translation and scaled it up to high resolution image datasets. Given two domains, $\mathcal{X}$ 705 and $\mathcal{Y}$ 710, endowing two ground-truth distributions p(x): x ∈ $\mathcal{X}$ and p(y): y ∈ $\mathcal{Y}$, the goal is to learn two energy functions $E_{\mathcal{X}}(x): \mathcal{X} \to \mathbb{R}$ and $E_{\mathcal{Y}}(y): \mathcal{Y} \to \mathbb{R}$ and use their short-run Langevin dynamics for image-to-image translation. Here, it is explained how to learn $E_{\mathcal{Y}}$ for one-sided image translation from $\mathcal{X}$ to $\mathcal{Y}$ since the other side is straightforward. In one or more embodiments, the target distribution p(y) ∝ exp(−$E_{\mathcal{Y}}(y)$) with the following short-run Langevin dynamics starting from the examples from source domain $\mathcal{X}$:

$$\tilde{y}_{t+1} = \tilde{y}_t - \frac{\eta_t}{2} \nabla_{\tilde{y}} E y(\tilde{y}_t) + \sqrt{\eta_t}\, \epsilon_t,\ \epsilon_t \sim \mathcal{N}(0, I), \quad (4)$$

$$\tilde{y}_0 = x \sim p_{data}(x),$$

which is also the translation process. An underlying assumption of applying EBM for image translation is that the two domains ($\mathcal{X}$, $\mathcal{Y}$) share the same ambient space where each data may be decomposed into a content code c 720 and a domain specific style code s$\mathcal{X}$ 715 of domain $\mathcal{X}$ 705 or s$\mathcal{Y}$ 725 of domain $\mathcal{Y}$ 710, respectively. This assumption may be considered somewhat similar to the partially shared latent space assumption by others; however, it is directly defined in the ambient space and is more efficient without resorting to complementary models. Consequently, as shown in FIG. 7, the above dynamic aims to evolve the style code s$\mathcal{X}$ towards s$\mathcal{Y}$, where the gradient descent steps into a lower energy area with content c unchanged as much as possible.

In one or more embodiments, training an EBM for image-to-image translation is similar to that of Methodology 1, with the exceptions that obtaining observed $\{x_i^{(s)}\}_{i=1}^{n^{(s)}} \sim p_{data}(x)$ is from target domain images and obtaining the initial synthesized images (e.g., $\{\tilde{x}_i^{(s)}\}_{i=1}^{n^{(s)}}$ and $\{\tilde{x}_i^{(s-1)}\}_{i=1}^{n^{(s)}}$) is from images in a source domain.

Figure 8:
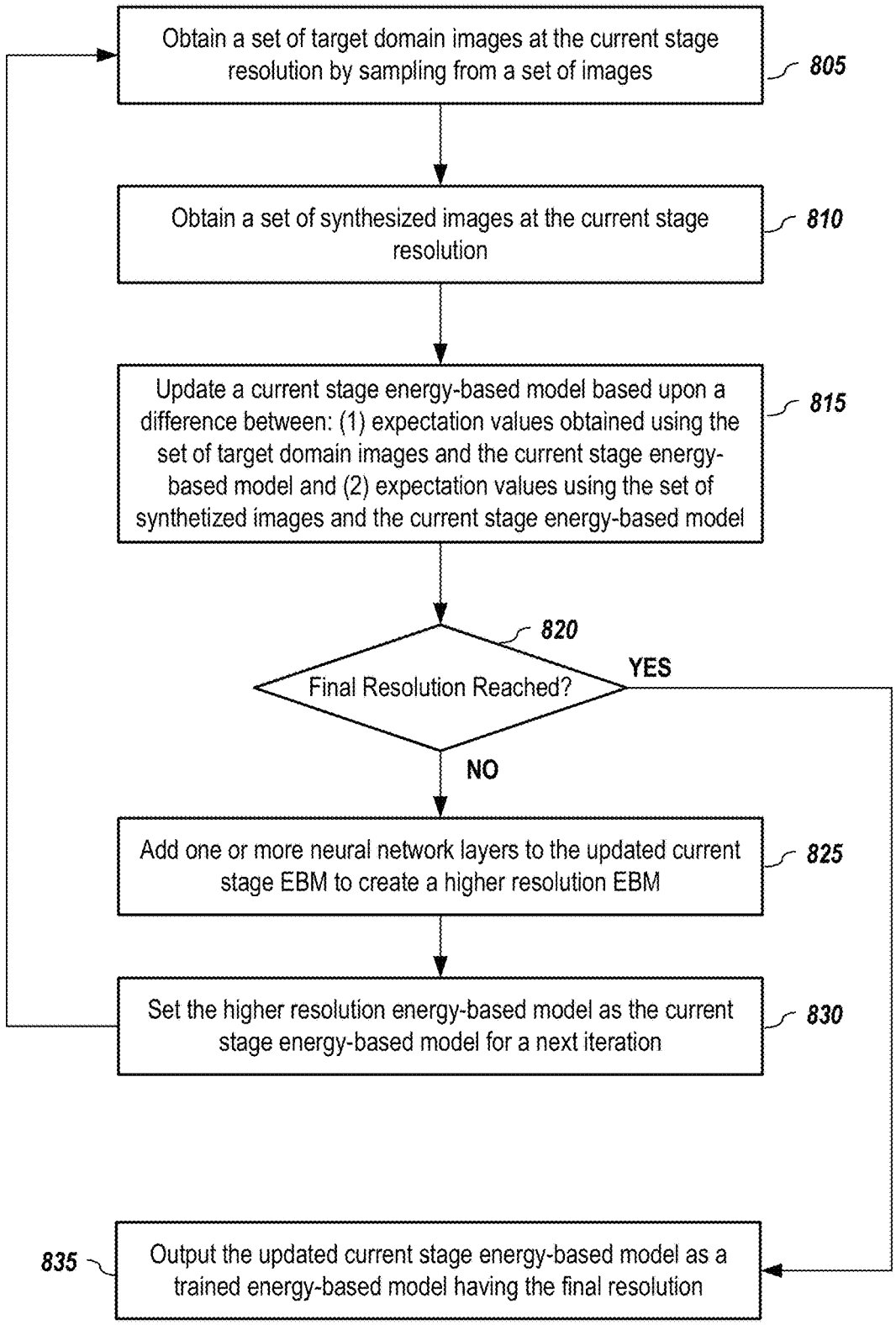
FIG. 8 depicts a method for training an energy-based model, according to embodiments of the present disclosure.

FIG. 8 depicts a method for training an EBM, according to embodiments of the present disclosure. In one or more embodiments, a set of target domain images at the current stage resolution are obtained (805) by sampling from a set of images in the target domain, and a set of synthesized images at the current stage resolution are also obtained (810).

The set of synthesized images may be obtained (810) by performing steps comprising: initializing a set of current stage synthesized images having the current stage resolution by sampling from a set of training images in a source domain; initializing a set of prior stage synthesized images having a prior stage resolution by sampling from a corresponding set of training images having the prior stage resolution which corresponds to the images sampled from a set of training images in the source domain that were used to initialize the set of current stage synthesized images; updating, via MCMC sampling, the set of prior stage synthesized images using a prior stage energy-based model; generating a set of smoothed synthesized images at the current stage resolution by combining the set of current stage synthesized images with the set of prior stage synthesized images that have been upsampled to the current stage resolution; and updating, via MCMC sampling, the set of synthesized images given the set of smoothed synthesized images and the current stage energy-based model.

If this is the first iteration, the process of obtaining the set of synthesized images at the current stage resolution may be done by initializing the set of synthesized images at the current stage resolution by sampling from a set of source domain images, and updating, via MCMC sampling, the set of synthesized images using the current stage energy-based model.

Given the set of target domain images and the set of synthesized images, the current stage energy-based model may be updated (815) based upon a difference between: (1) expectation values obtained using a set of target domain images at a current stage resolution and the current stage energy-based model and (2) expectation values using a set of synthesized images at the current stage resolution and the current stage energy-based model.

If the current stage energy-based model does not have (820) the final resolution capability, one or more neural network layers may be added (825) to the updated current stage energy-based model to create a higher resolution energy-based model for a next stage, in which the higher resolution energy-based model becomes (830) the current stage energy-based model for the next iteration. The process returns to the step of updating a current stage energy-based model for the next iteration.

Figure 9:
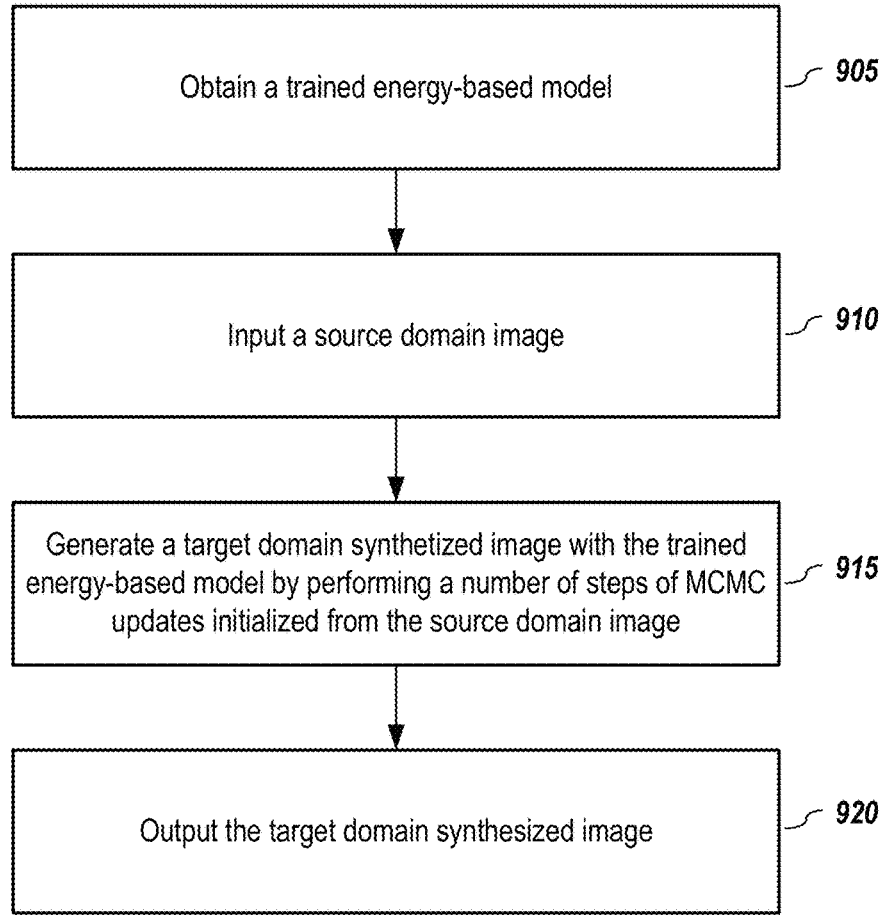
FIG. 9 depicts a method for using a trained energy-based model for image-to-image translation, according to embodiments of the present disclosure.

If the current stage energy-based model does have (820) the final resolution capability, the updated current stage energy-based model may be output (835) as the trained energy-based model having the final resolution. In one or more embodiments, the trained EBM may be used for image-to-image translation. FIG. 9 depicts a method for using a trained EBM for image-to-image translation, according to embodiments of the present disclosure.

As illustrated, given (905) a trained energy-based model, such as described herein using a multistage training process such as that described with respect to FIG. 8, one or more input samples in the source domain are also obtained (910). Given the trained energy-based model and the input sample in the source domain, a synthesized image in the target domain may be generated (915) by performing a number of MCMC updates. Once the updates are completed, the target domain synthesized image may be output (920).

Generative saliency map. With an embodiment of the methodology herein, image translation dynamics were performed. Three datasets were selected for experiments because each contained different kinds of generative saliency, e.g., color, shape, and texture. A major benefit of applying an embodiment of the EBM generative model is interpretability. In one or more embodiments, to make the translation process interpretable, gradient-based saliency maps were adopted to highlight the essential aspects that lead to the translation, which are referred to herein as a generative saliency map. It may be computed as the aggregated gradients in Eq. (4), i.e., $\Sigma_t \nabla_{\tilde{y}} E_y(\tilde{y}_t)$. It quantifies the magnitude of the change of each pixel that contributes to the image translation. It shall be noted that different types of generative saliency maps may be created. For example, experiments were conducted for unsupervised image-to-image translations with gradient-based generative saliency maps, according to embodiments of the present disclosure. Examples include transitioning from a cat image to a dog image, a photo to a Van Gogh-like image of the photo, and an orange to an apple.

6. Data Perturbation and Activation Function Embodiments

Most well-established EBMs add Gaussian noise to training data for stabilizing the training. Similarly, score-based models inject a decayed noise to improve the score estimation. However, the additive noise will at least slightly change the data distribution, thus resulting in foggy synthesized examples. See Appendix E.4 for more discussions. With the embodiments of the coarse-to-fine expanding and sampling strategy, EBM embodiments do not resort to data perturbation for stable training.

The effects of the activation function used in the energy function were also studied herein. When the data x is continuous, the smoothness of the derivative of the activation function may substantially affect the Langevin sampling process (because the derivative is inside $\nabla_x E_x$ in Eq. (3)), therefore applying an activation function with continuous gradients everywhere can stabilize the sampling. In this regard, different activation functions, including ReLU, LeakyReLU, CELU, Swish, and GELU, were analyzed and compared. It was observed that the non-smooth activations like ReLU and LeakyReLU may cause a divergence of learning. See Appendix E.5 for details.

D. Experiments

In this section, the results on a variety of tasks, including image generation, image restoration (inpainting and denoising), out-of-distribution (OOD), and unpaired image-to-image translation, are discussed. Most of them were implemented with the same network architecture and were run in the TITAN X (12 GB) platform. Examples of detailed architectures and experimental setting are provided in Section C.3 and E.1, respectively. Fréchet Inception Distance (FID) and Kernel Inception Distance (KID) were adopted for quantitative evaluation, and Amazon Turker Platform (AMT) was used for human perceptual evaluation (detailed in Appendix E.2). KID score tends to be more reliable when there are fewer testing images available (e.g., image translation). More synthesis results can be found in Appendix E.3. In Appendix E.5, a detailed ablation study was conducted for activation functions, normalization, etc. Finally, a model embodiment was scaled up to 512×512 resolution on a dataset in Appendix E.

It shall be noted that these experiments and results are provided by way of illustration and were performed under specific conditions using a specific embodiment or embodiments; accordingly, neither these experiments nor their results shall be used to limit the scope of the disclosure of the current patent document.

1. Image Generation Experiments

Datasets. (i) Dataset 1 is a dataset containing 60k images (32×32) of 10 classes; (ii) Dataset 2 is a facial dataset containing over 200k images. To be fairly compared with former EBM works, the 64×64 resolution is used for quantitative evaluation; (iii) Dataset 3 is a dataset containing 30k high resolution (512×512) facial images.

Qualitative Results. The quantitative unconditional image generation results on Dataset 1 and Dataset 2 are given in Table 2 and Table 3. In Table 3, † works are experimented on the center-crop (140×140) resized Dataset 2 whereas others are learned on the resized Dataset 2. In all cases, the tested CF-EBM embodiment outperformed other methods by a wide margin. In Table 4, the tested embodiment is compared with some representative open-sourced EBMs and with the score-based model in terms of the number of parameters and the relative computational time. All of the methods rely on Langevin dynamics for sampling. 50 Langevin steps were used for sampling for the tested model embodiment, while all other three methods required 60, 100, and even more steps, respectively. It was observed that the tested model embodiment consistently stands out in terms of memory and computation efficiency while keeping the lowest FID on Dataset 1.

TABLE 2

FID on Dataset 1

| Approach | Models | FID |
|---|---|---|
| VAE | VAE (Kingma & Welling, 2014) | 78.41 |
| Autoregressive | PixelCNN (Van den Oord et al., 2016) | 65.93 |
| | PixelIQN (Ostrovski et al., 2018) | 49.46 |
| GAN | WGAN-GP (Gulrajani et al., 2017) | 36.40 |
| | SN-GAN (Miyato et al., 2018) | 21.70 |
| | StyleGAN2-ADA (Karras et al., 2020) | 2.92 |
| Flow | Glow (Kingma & Dhariwal, 2018) | 45.99 |
| | Residual Flow (Chen et al., 2019a) | 46.37 |
| | Contrastive Flow (Gao et al., 2020) | 37.60 |
| Score-based | MDSM (Li et al., 2020) | 30.93 |
| | NCSN (Song & Ermon, 2019) | 25.332 |
| | NCK-SVGD (Chang et al., 2020) | 21.95 |
| EBM | Short-run EBM (Nijkamp et al., 2019) | 44.50 |
| | Multi-grid (Gao et al., 2018) | 40.01 |
| | EBM (ensemble) (Du & Mordatch, 2019) | 38.20 |
| | CoopNets (Xie et al., 2018b) | 33.61 |
| | EBM + VAE (Xie et al., 2021d) | 39.01 |
| | CF-EBM | 16.71 |

TABLE 3

FID on Dataset 2

| Models | FID |
|---|---|
| VAE (Kingma & Welling, 2014) | 79.09 |
| DCGAN (Radford et al., 2016) | 32.71 |
| NCSNv2 (Song & Ermon, 2020) | 28.90 |
| Short-run EBM (Nijkamp et al., 2019) | 23.02 |

TABLE 3-continued

FID on Dataset 2

| Models | FID |
|---|---|
| WGAN-GP (Gulrajani et al., 2017) | 21.40 |
| mr-Langevin (Block et al., 2020) | 19.54 |
| CF-EBM embodiment | 14.35 |
| CF-EBM embodiment† | 10.80 |

TABLE 4

Comparison of efficiency

| Models | #Params(M) | Time |
|---|---|---|
| EBM (ensemble) | 18.7 | 21.3 |
| NCSN | 7.6 | 14.2 |
| Short-run EBM | 2.8 | 2.2 |
| CF-EBM embodiment | 2.7 | 1.0 |

Model Analysis: Once the EBM is learned, it may be directly applied to image restoration tasks. Two experiments were conducted on image restoration to demonstrate the model embodiment's abilities of mode coverage and generalization to unseen data. (i) Image denoising: images were randomly selected from a testing dataset of Dataset 1, and each image x was polluted with an additive Gaussian noise $\epsilon \sim \mathcal{N}(0, 0.2)$. Denoised results $\tilde{x}$, which were obtained by Langevin dynamics initialized with $x+\epsilon$, on all classes of Dataset 1, implying a good generalization ability. (ii) Image inpainting: 25% area of each image was masked, and the Langevin dynamics of the learned EBM were used to recover the missing areas, which may be viewed as associative memory. For experimental results, each recovered image exhibited a meaningful but different recovered pattern than the ground truth. Diverse inpainting is further discussed in Appendix E.3; the results indicate a good mode coverage. Also obtained as part of experimental results were the nearest neighbors retrieved from training data for generated images, which showed that that the tested model embodiment does not memorize the training images (i.e., that the tested embodiment does not suffer from overfitting) but synthesizes novel ones.

2. Out-of-Distribution Detection Experiments

Out-of-distribution (OOD) detection is a binary classification problem. It has been shown that the likelihoods of EBMs may be useful for OOD detection. The EBM is expected to output a likelihood that is higher for an in-distribution example and lower for an out-of-distribution example. According to this principle, an OOD detection experiment was conducted, and a model embodiment was compared with the other three generative models, including Glow (Kingma & Dhariwal, 2018), conditional EBM (Du & Mordatch, 2019) and JEM (Grathwohl et al., 2020). All models are trained on Dataset 1, which is considered the in-distribution dataset. Various image datasets, including numbers, uniform distribution (Uniform), constant distribution (Constant), interpolations of images (Interp), and were used as OOD datasets. The Area Under the Receiver Operating Characteristics curve (AUROC) was used as a metric for evaluation. Unlike JEM (Grathwohl et al., 2020), the tested method embodiment of the current patent document did not incorporate any label information at the training stage, but it still shows better or competitive results, as shown in Table 5.

TABLE 5

Comparison of AUROC scores in OOD detection, in which higher scores indicate better performance. The other three models were all conditional generative models except for our CF-EBM model embodiment.

| Models | Dataset A | Dataset B | Dataset C | Dataset D | Dataset E | Average |
|---|---|---|---|---|---|---|
| Glow | .07 | 1.0 | .00 | .45 | .51 | .41 |
| EBM | .63 | 1.0 | .30 | .70 | .50 | .63 |
| JEM | .67 | 1.0 | .51 | .65 | .67 | .70 |
| CF-EBM (Ours) | .65 | 1.0 | .78 | .81 | .59 | .77 |

3. Unsupervised Image-to-Image Translation Experiments

Four unpaired image translation datasets were used for evaluation, including converting one animal to different type of animal, converting an outdoor view from one season to a different season, converting a photo to have a stylistic appearance of an artist, and converting one fruit or vegetable to a different fruit or vegetable. All images were resized to 256×256 pixels. More details are provided in Appendix E.8. A method embodiment of the current patent document was compared against CycleGAN (Zhu et al., 2017), CUT (Park et al., 2020) and two latest state-of-the-art methods U-GAT-IT (Kim et al., 2020) and FQ-GAN (Zhao et al., 2020). CycleGAN is a popular GAN-based image translation framework, and it was used to demonstrate a basic comparison between the GAN-based model with cycle consistency constraint and the tested energy-based model embodiment without cycle consistency constraint. CUT (Park et al., 2020) is the state-of-the-art one-sided unpaired image translation framework which applies the contrastive loss to preserve the content. U-GAT-IT and FQ-GAN are current leading models on certain image translations. The baseline results are from the published papers or checkpoints.

Quantitative Results: Results are shown in Table 6. In most cases, the tested model embodiment obtained better KID scores and human perceptual scores. Meanwhile, the training time and the model size are incredibly small. The efficiencies mainly come from two aspects: model design and optimization process.

(i) Model design: The EBM embodiment comprises an image-to-scalar energy function instead of an image-to-image mapping as in GAN-based methods. It implicitly transfers styles and preserves contents without cycle consistency constraint by Langevin dynamics, which is guided by the energy function. Thus, the model size is much smaller than that of GAN-based model which contains a pair of GANs.

(ii) Optimization process: GANs use the adversarial loss to match styles and the cycle loss to preserve the contents. In practice, the two losses are partially decoupled and optimized alternatively. In contrast, an embodiment herein applies MLE on one neural network (Eq. (2)) and practically, it was found that the training takes less iterations to converge. Although, in one or more embodiments, additional Langevin steps for sampling may be performed, the overall optimization cost is still low.

TABLE 6

Quantitative results of different methods on different image translation datasets.

| Models | cat → dog | | dog → cat | | Photo → Painting | | Painting → Photo | | #Params | #Days |
|---|---|---|---|---|---|---|---|---|---|---|
| | KID↓ | AMT↑ | KID↓ | AMT↑ | KID↓ | AMT↑ | KID↓ | AMT↑ | | |
| CycleGAN | 8.92 | 1.1 | 9.94 | 0.9 | 5.46 | 22.1 | 4.68 | 28.3 | 28.3M | — |
| U-GAT-IT | 7.07 | 16.0 | 8.15 | 40.9 | 4.28 | 28.7 | 5.61 | 10.5 | 671M | 6.0 |
| FQ-GAN | 6.44 | 31.3 | 8.90 | 35.3 | 6.54 | 15.9 | 5.21 | 20.4 | 671M | 6.0 |
| CF-EBM (ours) | 6.20 | 51.6 | 9.21 | 22.9 | 4.25 | 33.3 | 4.49 | 40.8 | 649K | 0.6 |

Qualitative Results: Experimental results showed that the tested model embodiment generated sharper images with superior visual quality than the baselines. It better preserved the source content while evolving the style from the source domain to the target domain.

E. Appendices

1. Experimental Settings

Embodiments were trained using Adam optimizer with $\beta_1=0.5$ and $\beta_2=0.999$. The learning rate schedule was set as $\alpha=\{8\times8: 0.001, 16\times16: 0.001, 32\times32\ 0.001, 64\times64: 0.0012, 128\times128: 0.0015\}$ and the data feeding schedule was set as $N=\{8\times8: 50k, 16\times16: 75k, 32\times32: 100k, 64\times64: 125k, 128\times128: 150k\}$. As to the sampling hyperparameters, the schedule of the number of Langevin steps was set as $T=\{8\times8: 15, 16\times16: 30, 32\times32: 50, 64\times64: 50, 128\times128: 60\}$ the Langevin step size was set as 1.0, and the variance of the Langevin noise term was set as $\eta_t=2e^{-2}-2e^{-2}/(T-t+1)$ in most experiments.

Dataset A was prepossessed to produce Dataset A-64 by using two different settings. (1) Each image was first center-cropped into 140×140 and then resized to 64×64. In Table 3, NCSN (Song & Ermon, 2019), mr-Langevin (Block et al., 2020), and WGAN-GP (Lee et al., 2018b) use this setting. The FID computation protocol was based on Song & Ermon (2019), where the FID score was calculated between 10k generated images and all test images. (2) Each image was directly resized to the resolution 64×64. The FID was computed on 40k generated samples. In Table 3, VAE, DCGAN, and short-run EBM follow this setting.

2. Evaluation Metrics

Three commonly used measures were considered for evaluating the quality of the synthesized images.
(i) Fréchet Inception Distance (FID) (Heusel et al., 2017) compares the distribution of generated images with the distribution of training images. Instead of directly comparing images, the FID compares the mean and standard deviation of one of the deeper layers in Inception v3 (Szegedy et al., 2016), which is a convolutional neural network trained for classification. The FID is consistent with human perceptual judgement. Lower FID scores indicate that the model can generate images with higher quality. A dataset split protocol similar to that in Zhang et al. (2020) was used to compute the FID.
(ii) Kernel Inception Distance (KID) (Bińkowski et al., 2018) is an unbiased metric that computes the squared maximum mean discrepancy (MMD) between Inception representations, making it more reliable than FID especially when the number of test images is small. For evaluating the image translation performance, KID was computed between the translated images from test images in the source domain and the test images in the target domain. Lower KID scores indicate the better translation results. Kim et al. (2020) was followed to compute KID.
(iii) For human perceptual evaluation using Amazon Turker Platform, settings the same as or similar to those in Zhao et al. (2020) were used. Each testing image was judged by six participants, who were asked to select the best translated images by taking image visual quality and source content preservation into consideration. The participants were informed of the information of the target domain, e.g., six examples of images in the target domain were shown to them for reference.

3. More Image Synthesis Results

Images were generated from a test CF-EBM embodiment that was learned using Dataset 1 and Dataset 4 (32×32 pixels) datasets. Table 7 presents the quantitative results of image generation on Dataset 4. The CF-EBM embodiment achieves competitive results in terms of FID with many fewer parameters.

TABLE 7

| | FID on Dataset 4 (32 × 32 pixels). | | |
|---|---|---|---|
| Approach | Models | FID | #Params |
| Unconditional | PixelCNN (Van den Oord et al., 2016) | 40.51 | >35M |
| | PixelIQN-small | 37.62 | >35M |
| | PixelIQN-big | 26.56 | >50M |
| | CF-EBM Embodiment | 26.31 | 5.82M |
| Conditional | PixelCNN | 33.27 | — |
| | PixelIQN (Ostrovski et al., 2018) | 22.99 | |
| | EBM (Du & Mordatch, 2019) | 14.31 | |
| Self-supervision | SS-GAN (Chen et al., 2019b) | 17.10 | — |
| | MS-GAN (Tran et al., 2019) | 12.30 | |

The channel multiplier is ch = 48.

The short-run Langevin dynamics initialized from the uniform noise distribution for generating Dataset 2 images were also visualized. Results of image inpainting on test images of Dataset 2 at 64×64 resolution were also generated. Running Langevin dynamics on the occluded images, one can observe diversity of image completion. Results demonstrate that embodiments generalize well to unseen test data and the MCMC of the learned model embodiments have a good property of mode coverage. The tested model embodiment completed the occluded areas with different meaningful facial expressions and with different positions of occlusion.

Generated samples were compared with their nearest neighbors retrieved from the training data. It was found that the synthesized images were not identical to the training data, which means that the tested model embodiment learns to generate new image patterns instead of reconstructing the existing training images.

4. Effect of Data Perturbation

Almost all energy-based related generative models add Gaussian noise $\mathcal{N}(0, \sigma^2 I)$ to perturb the training data for stabilizing the training. The effect of such a data perturbation was explored. Nijkamp et al. (2019) have already reported that a larger perturbation would lead to a lower FID score, and the minimum standard deviation of the additive noise they use was $\sigma=0.03$. Also, Song & Ermon (2019) applied a perturbation with a decayed standard deviation from $\sigma=1.0$ to $\sigma=0.1$. It may be claimed that an EBM learned from the training data with additive noise will memorize the noise information even if it is very small. As a result, the synthesized images will look noisy and foggy. Results of test showed the effect of the data perturbation by illustrating the synthesized images generated by the models learned with different levels of data perturbations. It was noted that, even if the standard deviation of the additive noise was as small as $\sigma=0.01$, the effects reflected in the synthesized images were visible. The same observation may be found from the synthesized images shown in FIG. 2 of Nijkamp et al.

(2019), FIG. 1 of Song & Ermon (2020) and FIG. 2 of Grathwohl et al. (2020), all of which use data perturbation during training. However, embodiments herein do not rely on the additive noise during training, thus leading to better synthesis quality.

5. Ablation Study

The ablation studies mainly examined the activation functions, normalization and layer connections.

a) Activation Function

The following activation functions were compared by presenting their formulas and derivatives:

Rectified Linear Unit (ReLU) (Nair & Hinton, 2010): $f(x)=\max(0, x)$, and the derivative:

$$\frac{\partial f(x)}{\partial x} = \begin{cases} 1 & \text{if } x > 0 \\ 0 & \text{otherwise} \end{cases} \quad (5)$$

Leaky Rectified Linear Unit (LeakyReLU) (Maas et al., 2013): $f(x)=\max(0, x)+\alpha\cdot\min(0, x)$, and the derivative:

$$\frac{\partial f(x)}{\partial x} = \begin{cases} 1 & \text{if } x > 0 \\ \alpha & \text{otherwise} \end{cases} \quad (6)$$

where $\alpha=0.2$ is the common setting.

Continuously Differential Exponential Linear Unit (CELU) (Barron, 2017): $f(x)=\max(0,x)+\min(0,\alpha\cdot(\exp(x/\alpha)-1)$, where $\alpha$ is a shape parameter and the derivative is:

$$\frac{\partial f(x)}{\partial x} = \begin{cases} 1 & \text{if } x > 0 \\ \alpha \cdot (\exp(x/\alpha) - 1) & \text{otherwise} \end{cases} \quad (7)$$

Swish (Ramachandran et al., 2016): $f(x)=x\cdot\sigma(\beta x)$, where $\sigma(\cdot)$ is Sigmoid function and $\beta$ is a learnable parameter. The derivative is:

$$\frac{\partial f(x)}{\partial x} = \beta x \cdot \sigma(x) + \sigma(\beta x)(1 - \beta x \cdot \sigma(\beta x)). \quad (8)$$

$\beta$ was set as $\beta=1$ for experiments.

Gaussian Error Linear Unit (GELU) (Hendrycks & Gimpel, 2016b): $f(x)=x\cdot\Phi(x)$ where $\Phi(\cdot)$ is the cumulative distribution function for Gaussian distribution. It can be approximated by $f(x)\approx 0.5\times(1+\tan h \sqrt{2/\pi}(x+0.044715x^3)))$.

Figure 10:
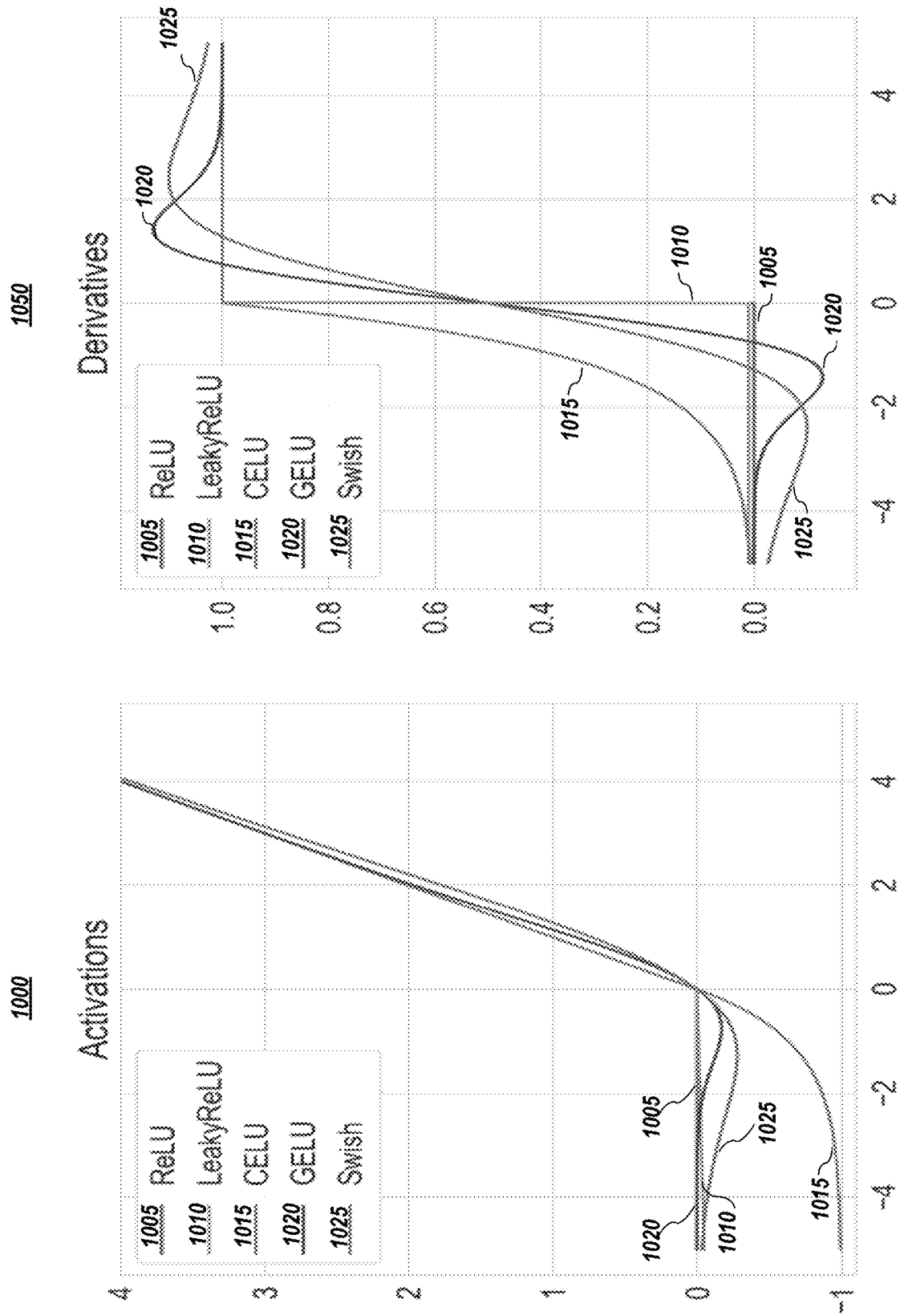
FIG. 10 visualizes the above activation functions and their derivatives, according to embodiments of the present disclosure.

FIG. 10 visualizes the above activation functions 1000 and their derivatives 1050, according to embodiments of the present disclosure. FIG. 10 shows comparisons for ReLU 1005, Leaky ReLU 1010, CELU 1015, GELU 1020, and Swish 1025. Obviously, both ReLU and LeakyReLU are non-smooth around 0. Quantitative results of image synthesis with different activation functions on Dataset 1 are shown in Table 8. It was found that models using LeakyReLU or ReLU activation functions tended to diverge early. These phenomena were also observed in the Dataset 2 experiments. Therefore, smoothness of the activation may improve the training stability and synthesis quality of EBMs.

Since the objective in Eq. (2) is similar to that in Wasserstein GAN, and the bottom-up energy function in the EBM acts as a discriminator, we thus naturally consider spectral normalization to improve the performance and stability. The spectral normalization constrains the Lipschitz constant of the learnable neural network parameters, which is widely used to stabilize the training of the discriminator network of GAN.

TABLE 8

Effects of different activation functions

| Activation function | FID |
|---|---|
| ReLU | N/A |
| LeakyReLU | 78.21 |
| GELU | 28.71 |
| CELU ($\alpha = 1$) | 21.50 |
| Swish | 16.71 | b) Normalization

Since the objective in Eq. (2) may be considered to be similar to that in Wasserstein GAN, and the bottom-up energy function in the EBM acts as a discriminator, spectral normalization (Miyato et al., 2018) was naturally considered to improve the performance and stability. The spectral normalization constrains the Lipschitz constant of the learnable neural network parameters, which is widely used to stabilize the training of the discriminator network of GAN.

The batch normalization is not appropriate here, because each Langevin step relies on the running mean/variance of $x \sim p_{data}(x)$. Even if the statistics are not updated in Eq. (3), the distribution of $p_\theta(x_t)$ keeps changing all the time along a chain. As a result, the pre-computed statistics of the batch normalization are not suitable for $x_t$ at different step t. Other normalizations, e.g., instance normalization and layer normalization, are not appropriate experimentally.

c) Analysis of Different Components

How each component affects a model embodiment's performance was examined. Components include progressive growing, residual connection, and spectral normalization. Results are shown in Table 9, below.

TABLE 9

Ablation study on Dataset 1.

| Configuration | FID |
|---|---|
| (a) Basic CF-EBM | 32.01 |
| (b) + Spectral normalization | 20.83 |
| (c) + Residual connection | 16.71 |
| (d) − Coarse-to-fine | 24.67 |
| (e) Fix coarse EBM | 21.25 |

From (a)-(c), it was found that both spectral normalization and residual connection can improve the image synthesis quality. In (d), the coarse-to-fine training was disabled but still kept residual connection and spectral normalization, the performance dropped. Besides, the time efficiency regarding the training with and without the coarse-to-fine strategy was also compared. It is observed that the model embodiment without using coarse-to-fine learning requires approximately 3× more time than the counterpart to converge. In (e), multiple EBMs were sequentially trained at different resolutions in a coarse-to-fine manner. It was tried to fix the coarse EBMs when sequentially training model at higher resolution, and the coarse EBM was used to initialize the sampling of the fine EBM. All EBMs were kept after training. It was found that the FID of (e) was worse than that of learning a single fine EBM as in (c).

6. Likelihood Evaluation

An experiment on a dataset for likelihood evaluation following the same or similar settings in Du & Mordatch (2019) was conducted. The evaluations applied the Annealed Importance Sampling (AIS) to obtain a bound of the partition function. It was seen that the model embodiment produced realistic digits. Table 10 shows a comparison of the log-likelihood among three likelihood-based models.

TABLE 10

Log-likelihood in Nats.

| Models | Lower Bound | Upper Bound |
| --- | --- | --- |
| NICE (Dinh et al., 2014) | 1980.0 | 1980.0 |
| EBM (Du & Mordatch, 2019) | 1225.0 | 2218.3 |
| CF-EBM Embodiment | 2197.7 | 2342.0 |

7. Scaling-Up CF-EBM Embodiments for High Resolution Synthesis

To scale up EBMs for sampling high resolution images, intermediate CF-EBMs that have been learned in Methodology 1 were integrated. When the training entered into modeling higher resolution, the coarse-level CF-EBM, which produces initial points for fine-level CF-EBM samplers, was fixed. In this scenario, the number of Langevin steps may be reduced to 15 to expedite sampling at each scale, meaning that generating 256×256 images requires 90 steps. On a single TITAN X GPU (12 GB), the total training time (200k iterations) of Dataset 3 128×128 and 256×256 are about 120 hours and 235 hours, respectively. On a single TITAN V100 GPU, these costs can be reduced to 55 hours and 100 hours (it was tested once).

In this experiment, the initial variance was fixed as $\eta_0=0.03$ for the noise term of Langevin dynamics in Eq. (3) during training. It was observed that, at the testing stage, choosing a different value than that used for training may largely affect the synthetic results. A larger $\eta_0$ for the noise term tends to make the synthesized images not only more realistic but also noisier. In experiments, the channel multiplier was set as c=32, and it was trained for 5 days on a single GPU. In other experiments, generated samples at 512×512 resolution where the channel multiplier was set as c=48, and the model was trained for 10 days on a single GPU. Table 11 compares the FID scores of different models on Dataset 3 at 128×128 resolution. The model embodiment obtained competitive performance without using any regularization term.

TABLE 11

FID for image generation (128 × 128).

| Models | FID |
| --- | --- |
| Glow (Kingma & Dhariwal, 2018) | 68.93 |
| SN-GAN (Miyato et al., 2018) | 25.95 |
| WGAN-GP (Gulrajani et al., 2017) | 22.57 |

TABLE 11-continued

FID for image generation (128 × 128).

| Models | FID |
| --- | --- |
| CR-GAN (Zhang et al., 2020) | 16.97 |
| CF-EBM Embodiment | 23.50 |

Results of GAN-based approaches were taken from Zhang et al. (2020).

8. Unpaired Image-to-Image Translation a) Dataset

In this patent document, experiments were conducted on five image-to-image translation datasets: (i) Dataset A: This dataset contained a selfie domain and an anime domain, each of which has ~3400 training images and ~100 testing images. (ii) Dataset B: This dataset is used for collection style transfer. It has ~6,300 photo images and 400 painting images of a painter in the training set and ~750 photo images and ~400 painting images in the test set. (iii) Dataset C: This dataset is used for object transfiguration. It has ~1000 training images and ~270 test images for the object 1 category and ~1019 training images and ~250 test images for the object 2 category. (iv) Dataset D: This dataset is used for season transfer. The summer category has ~1300 training images and ~300 test images, while the winter category has ~900 training images and ~240 test images. (v) Dataset E: The numbers of images for animal 1 and animal 2 are ~875 and ~1,400, respectively. 100 animal 1 images and 100 animal 2 images were used as test data.

b) Experimental Settings

For the unpaired image-to-image translation task, only two changes were made compared with the setting used in image generation: (i) the channel multiplier was set as c=16; and (ii) the learning rate was multiplied by 10 only for animal 2→animal 1.

c) Comparisons with Contrastive Unpaired Translation (CUT)

CUT was implemented based on its open-source code. The most realistic translated results by CUT on animal 1→animal 2 were selected. The results were compared with the results of a CF-EBM embodiment, and it was seen that CUT sometimes hallucinates a tongue, resulting in unfaithful translation results. This observation was also mentioned in the original paper (Park et al., 2020). In contrast, the CF-EBM embodiment produced more faithful translation results.

9. Cited Documents

Each reference/document mentioned in this patent document, including but not limited to those citations listed below, is incorporated by reference herein in its entirety.

Mikolaj Bińkowski, Dougal J. Sutherland, Michael Arbel, and Arthur Gretton. Demystifying MMD GANs. In *International Conference on Learning Representations (ICLR)*, 2018.

Adam Block, Youssef Mroueh, Alexander Rakhlin, and Jerret Ross. Fast Mixing of Multi-Scale Langevin Dynamics Under the Manifold Hypothesis. arXiv preprint *arXiv*:2006.11166, 2020.

Wei-Cheng Chang, Chun-Liang Li, Youssef Mroueh, and Yiming Yang. Kernel Stein Generative Modeling. arXiv preprint *arXiv:*2007.03074, 2020.

Ricky T Q Chen, Jens Behrmann, David K Duvenaud, and Jörn-Henrik Jacobsen. Residual Flows for Invertible Generative Modeling. In *Advances in Neural Information Processing Systems*, pp. 9916-9926, 2019a.

Ting Chen, Xiaohua Zhai, Marvin Ritter, Mario Lucic, and Neil Houlsby. Self-Supervised GANS via Auxiliary Rotation Loss. In *Proceedings of the IEEE Conference on Computer Vision and Pattern Recognition (CVPR)*, pp. 12154-12163, 2019b.

Laurent Dinh, David Krueger, and Yoshua Bengio. NICE: Non-linear independent components estimation. arXiv preprint *arXiv:*1410.8516, 2014.

Yilun Du and Igor Mordatch. Implicit Generation and Modeling With Energy-Based Models. In *Advances in Neural Information Processing Systems (NeurIPS)*, pp. 3608-3618, 2019.

Ruiqi Gao, Yang Lu, Junpei Zhou, Song-Chun Zhu, and Ying NianWu. Learning Generative Convnets Via Multi-Grid Modeling and Sampling. In *Proceedings of the IEEE Conference on Computer Vision and Pattern Recognition*, pp. 9155-9164, 2018.

Ruiqi Gao, Erik Nijkamp, Diederik P. Kingma, Zhen Xu, Andrew M Dai, and Ying Nian Wu. Flow Contrastive Estimation of Energy-Based Models. In *Proceedings of the IEEE/CVF Conference on Computer Vision and Pattern Recognition*, pp. 7518-7528, 2020.

Will Grathwohl, Kuan-Chieh Wang, Joern-Henrik Jacobsen, David Duvenaud, Mohammad Norouzi, and Kevin Swersky. Your Classifier Is Secretly An Energy-Based Model And You Should Treat It Like One. In *International Conference on Learning Representations (ICLR)*, 2020.

Ishaan Gulrajani, Faruk Ahmed, Martin Arjovsky, Vincent Dumoulin, and Aaron C Courville. Improved Training of Wasserstein GANs. In *Advances In Neural Information Processing Systems*, pp. 5767-5777, 2017.

Martin Heusel, Hubert Ramsauer, Thomas Unterthiner, Bernhard Nessler, and Sepp Hochreiter. GANs trained by a two time-scale update rule converge to a local Nash Equilibrium. In *Advances in Neural Information Processing Systems (NIPS)*, pp. 6626-6637, 2017.

Tero Karras, Miika Aittala, Janne Hellsten, Samuli Laine, Jaakko Lehtinen, and Timo Aila. Training generative adversarial networks with limited data. *Advances in Neural Information Processing Systems (NeurIPS)*, 2020.

Junho Kim, Minjae Kim, Hyeonwoo Kang, and Kwang Hee Lee. U-GAT-IT: Unsupervised Generative Attentional Networks With Adaptive Layer-Instance Normalization For Image-To-Image Translation. In *International Conference on Learning Representations (ICLR)*, 2020.

Diederik P. Kingma and Max Welling. Auto-Encoding Variational Bayes. In *International Conference on Learning Representations (ICLR)*, 2014.

Durk P Kingma and Prafulla Dhariwal. Glow: Generative Flow with Invertible 1×1 Convolutions. In *Advances In Neural Information Processing Systems (NeurIPS)*, pp. 10215-10224, 2018.

Zengyi Li, Yubei Chen, and Friedrich T. Sommer. Annealed Denoising Score Matching: Learning Energy-Based Model In High-Dimensional Spaces. arXiv preprint *arXiv:*1910.07762, 2020.

Takeru Miyato, Toshiki Kataoka, Masanori Koyama, and Yuichi Yoshida. Spectral Normalization for Generative Adversarial Networks. In *International Conference on Learning Representations (ICLR)*, 2018.

Erik Nijkamp, Mitch Hill, Song-Chun Zhu, and Ying Nian Wu. Learning Non-Convergent Non-Persistent Short-Run MCMC Toward Energy-Based Model. In *Advances in Neural Information Processing Systems*, pp. 5232-5242, 2019.

Georg Ostrovski, Will Dabney, and Remi Munos. Autoregressive Quantile Networks for Generative Modeling. In *International Conference on Machine Learning (ICML)*, pp. 3936-3945, 2018.

Taesung Park, Alexei A. Efros, Richard Zhang, and Jun-Yan Zhu. Contrastive Learning For Unpaired Image-To-Image Translation. In *Proceedings of the European Conference on Computer Vision (ECCV)*, 2020.

Alec Radford, Luke Metz, and Soumith Chintala. Unsupervised representation learning with deep convolutional generative adversarial networks. In *International Conference on Learning Representations (ICLR)*, 2016.

Yang Song and Stefano Ermon. Generative Modeling by Estimating Gradients of the Data Distribution. In *Advances in Neural Information Processing Systems (NeurIPS)*, pp. 11918-11930, 2019.

Yang Song and Stefano Ermon. Improved Techniques for Training Score-Based Generative Models. arXiv preprint *arXiv:*2006.09011, 2020.

Christian Szegedy, Vincent Vanhoucke, Sergey Ioffe, Jon Shlens, and Zbigniew Wojna. Rethinking the inception architecture for computer vision. In *Proceedings of the IEEE Conference On Computer Vision And Pattern Recognition (CVPR)*, pp. 2818-2826, 2016.

Ngoc-Trung Tran, Viet-Hung Tran, Bao-Ngoc Nguyen, Linxiao Yang, et al. Self-Supervised GAN: Analysis and Improvement with Multi-Class Minimax Game. In *Advances in Neural Information Processing Systems (NeurIPS)*, pp. 13253-13264, 2019.

Aaron Van den Oord, Nal Kalchbrenner, Lasse Espeholt, Oriol Vinyals, Alex Graves, et al. Conditional Image Generation with PixelCNN Decoders. In *Advances in neural information processing systems*, pp. 4790-4798, 2016.

Jianwen Xie, Yang Lu, Ruiqi Gao, Song-Chun Zhu, and Ying Nian Wu. Cooperative Training of Descriptor and Generator Networks. *IEEE Transactions On Pattern Analysis And Machine Intelligence (TPAMI)*, 42(1):27-45, 2018b.

Jianwen Xie, Zilong Zheng, and Ping Li. Learning energy-based model with variational auto-encoder as amortized sampler. In *The Thirty-Fifth AAAI Conference on Artificial Intelligence (AAAI)*, 2021d.

Han Zhang, Zizhao Zhang, Augustus Odena, and Honglak Lee. Consistency Regularization for Generative Adversarial Networks. In *International Conference on Learning Representations (ICLR)*, 2020.

Yang Zhao, Chunyuan Li, Ping Yu, Jianfeng Gao, and Changyou Chen. Feature Quantization Improves GAN Training. In *International Conference on Machine Learning (ICML)*, pp. 11376-11386, 2020.

Jun-Yan Zhu, Taesung Park, Phillip Isola, and Alexei A Efros. Unpaired Image-To-Image Translation Using Cycle-Consistent Adversarial Networks. In *Proceedings of the IEEE International Conference on Computer Vision (ICCV)*, pp. 2223-2232, 2017.

F. Some Observations

To tackle the training instability and the multimodal MCMC sampling difficulty of the EBMs, presented herein are embodiments of a multistage coarse-to-fine expanding and sampling strategy, which may be referred to generally, for convenience, as CF-EBM. Extensive experiments demonstrate the superior performance of the proposed framework embodiments, compared with various generative models, in terms of sample quality, computation, and memory efficiency. The success of the CF-EBM may be considered to be due, at least in part, to the proposed progressive expanding and sampling strategy, architecture design of energy functions, and the selective smooth activation. It is thought that CF-EBM is the first pure EBM that can synthesize high-fidelity images and also be competent in the unsupervised image-to-image translation. One skilled in the art shall recognize that different, such as larger architectures, may be used for better performance and shall recognize that embodiments may be applied to or adapted for other energy-based applications.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 11:
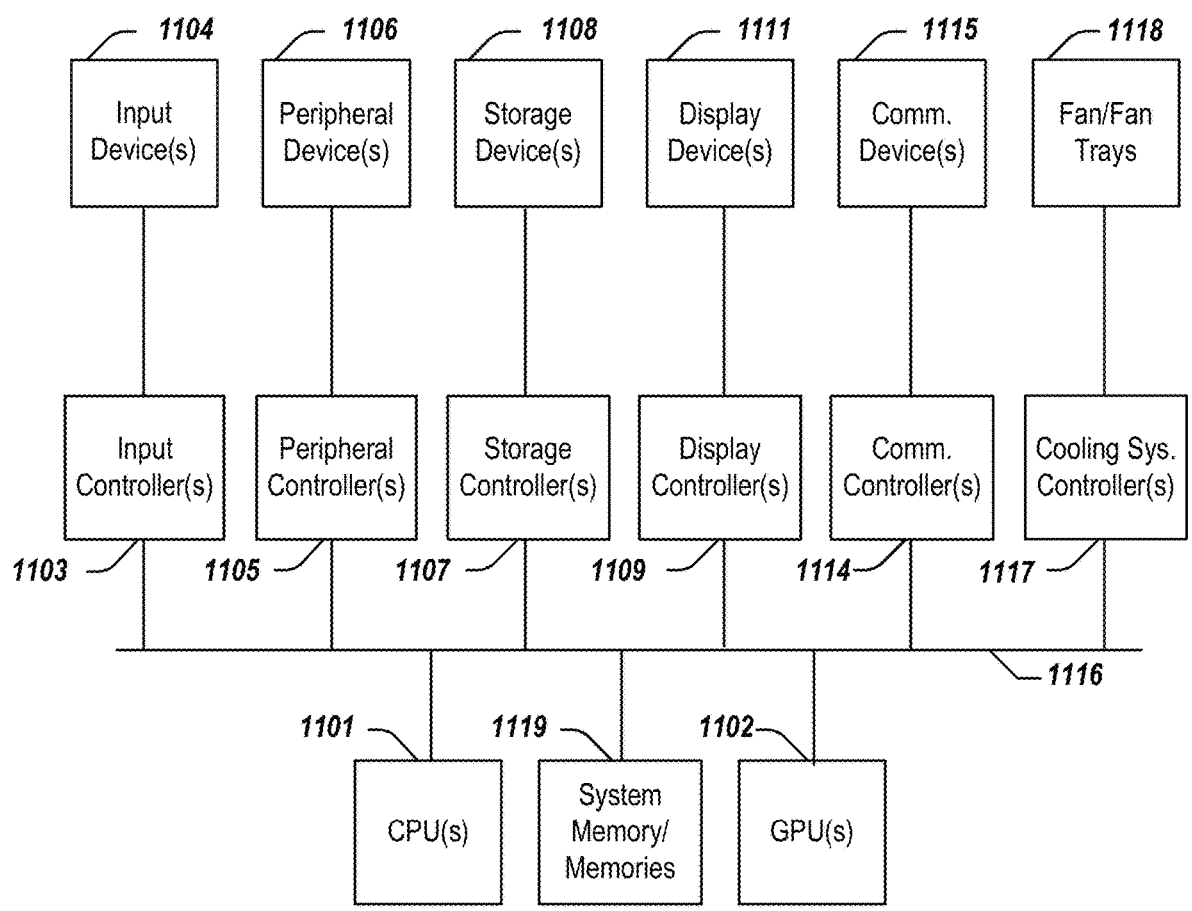
FIG. 11 depicts a simplified block diagram of a computing device/information handling system, according to embodiments of the present disclosure.

FIG. 11 depicts a simplified block diagram of an information handling system (or computing system), according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more CPUs 1101 that provides computing resources and controls the computer. CPU 1101 may be implemented with a microprocessor or the like, and may also include one or more graphics processing units (GPU) 1102 and/or a floating-point coprocessor for mathematical computations. In one or more embodiments, one or more GPUs 1102 may be incorporated within the display controller 1109, such as part of a graphics card or cards. The system 1100 may also include a system memory 1119, which may comprise RAM, ROM, or both.

A number of controllers and peripheral devices may also be provided, as shown in FIG. 11. An input controller 1103 represents an interface to various input device(s) 1104. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT) display, a thin film transistor (TFT) display, organic light-emitting diode, electroluminescent panel, plasma panel, or any other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1100 comprises one or more fans or fan trays 1118 and a cooling subsystem controller or controllers 1117 that monitors thermal temperature(s) of the system 1100 (or components thereof) and operates the fans/fan trays 1118 to help regulate the temperature.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training an energy-based model comprising:
   obtaining a set of images having a current stage resolution;
   obtaining an initial set of current stage synthesized images having the current stage resolution;
   obtaining a set of prior stage synthesized images, in which the prior stage synthesized images having a prior stage resolution that is a lower resolution than the current stage resolution;
   generating, via Markov chain Monte Carlo (MCMC) sampling, a set of updated prior stage synthesized images given the set of prior stage synthesized images and a prior stage energy-based model that comprises an input at the prior stage resolution;
   generating an updated initial set of current stage synthesized images having the current stage resolution by combining the initial set of current stage synthesized images with the set of updated prior stage synthesized images that have been upsampled to the current stage resolution;
   generating, via Markov chain Monte Carlo (MCMC) sampling, a set of updated current stage synthesized images given the updated initial set of current stage synthesized images and a current stage energy-based model that has an input at the current stage resolution;
   updating the current stage energy-based model using:
      a first set of values obtained using a set of images and the current stage energy-based model; and
      a second set of values obtained using the set of updated current stage synthesized images and the current stage energy-based model;
   responsive to the current stage resolution not being a final resolution:
      modifying the updated current stage energy-based model to generate an expanded energy-based model having a higher resolution than the current stage resolution;
      setting the updated current stage energy-based model as the prior stage energy-based model for a next iteration and its resolution as the prior stage resolution for the next iteration;
      setting the expanded energy-based model as the current stage energy-based model for the next iteration and its resolution as the current stage resolution for the next iteration; and
      iterating by returning to the step of obtaining a set of images having the current stage resolution; and
   responsive to the current stage resolution having a final resolution, outputting the updated current stage energy-based model as a trained energy-based model having the final resolution.

2. The computer-implemented method of claim 1 further comprising:
   responsive to being a first iteration:
      obtaining a set of images having a current stage resolution, which is a lowest resolution;
      obtaining an initial set of current stage synthesized images having the current stage resolution;
      generating, via Markov chain Monte Carlo (MCMC) sampling, a set of updated current stage synthesized images given the initial set of current stage synthesized images and a current stage energy-based model that has an input at the current stage resolution;
      updating the current stage energy-based model using:
         values obtained using the set of real images and the current stage energy-based model; and
         values using the set of updated current stage synthesized images and the current stage energy-based model; and
      proceeding to the step of responsive to the current stage resolution not being a final resolution.

3. The computer-implemented method of claim 1 wherein the step of obtaining an initial set of current stage synthesized images having the current stage resolution comprises:
    initializing the initial set of current stage synthesized images from a uniform noise distribution.

4. The computer-implemented method of claim 1 wherein the step of obtaining a set of images having a current stage resolution comprises:
    given a set of training images at the final resolution:
        responsive to the current stage resolution not being the final resolution:
            downsampling training images from the set of training images to the current stage resolution; and
            sampling from the downsampled training images to obtain the set of images having the current stage resolution; and
        responsive to the current stage resolution being the final resolution, sampling from the training images to obtain the set of images having the current stage resolution.

5. The computer-implemented method of claim 1 wherein the step of generating, via Markov chain Monte Carlo (MCMC) sampling, a set of updated current stage synthesized images given the updated initial set of current stage synthesized images and a current stage energy-based model that has an input at the current stage resolution comprises:
    using short-run MCMC sampling with a fixed number of Langevin steps.

6. The computer-implemented method of claim 1 wherein the step of modifying the updated current stage energy-based model to generate an expanded energy-based model having a higher resolution than the current stage resolution comprises:
    removing a red-green-blue (RGB) block that transforms a 3-channel RGB image to a z-channel feature map, where z is number of channels of each kernel at a bottom convolutional layer of the updated current stage energy-based model and that has the current stage resolution; and
    adding an expanding block and a new RGB block that each have the higher resolution.

7. The computer-implemented method of claim 6 wherein the expanding block comprises:
    a primal block comprising two convolutional layers, wherein a first convolutional layer of the primal block does not change a spatial size and a second convolutional layer of the primal block has a stride for downsampling; and
    a fading block comprising a convolution layer followed by an average pooling to link previous coarse-level layers.

8. The computer-implemented method of claim 1 further comprising:
    using the trained energy-based model having the final resolution to generate a synthesized image at the final resolution.

9. A computer-implemented method for training an energy-based model comprising:
    starting with a minimal resolution energy-based model and successively increasing model resolution capability through stages until a final resolution capability for the energy-based is reached, each stage comprising steps comprising:
        updating a current stage energy-based model using:
            (1) values obtained using a set of training images at a current stage resolution input into the current stage energy-based model; and
            (2) values obtained using a set of synthesized images at the current stage resolution input into the current stage energy-based model;
        responsive to the current stage energy-based model not having the final resolution capability:
            adding one or more neural network layers to the updated current stage energy-based model to create a higher resolution energy-based model for a next stage;
            setting the higher resolution energy-based model as the current stage energy-based model for a next iteration; and
            returning to the step of updating a current stage energy-based model for the next iteration; and
        responsive to the current stage energy-based model having the final resolution capability, outputting the updated current stage energy-based model as a trained energy-based model having the final resolution.

10. The computer-implemented method of claim 9 further comprising:
    responsive being a first iteration:
        obtaining the set of training images at the current stage resolution by sampling from a set of non-synthesized images; and
        obtaining the set of synthesized images at the current stage resolution by performing steps comprising:
            initializing the set of synthesized images having the current stage resolution by sampling from a distribution; and
            updating, via Markov chain Monte Carlo (MCMC) sampling, the set of synthesized images using the current stage energy-based model.

11. The computer-implemented method of claim 9 further comprising:
    obtaining the set of training images at the current stage resolution by sampling from a set of non-synthesized images; and
    obtaining the set of synthesized images at the current stage resolution by performing steps comprising:
        initializing a set of current stage synthesized images having the current stage resolution by sampling from a distribution;
        initializing a set of prior stage synthesized images having a prior stage resolution by sampling from the distribution;
        updating, via Markov chain Monte Carlo (MCMC) sampling, the set of prior stage synthesized images using a prior stage energy-based model;
        generating a set of smoothed synthesized images at the current stage resolutions by combining the set of current stage synthesized images with the updated set of prior stage synthesized images that have been upsampled to the current stage resolution; and
        updating, via Markov chain Monte Carlo (MCMC) sampling, the set of synthesized images given the set of smoothed synthesized images and the current stage energy-based model.

12. The computer-implemented method of claim 11 wherein the step of obtaining the set of training images at the current stage resolution by sampling from a set of non-synthesized images comprises:
    given a set of training images at the final resolution:
        responsive to the current stage resolution not being the final resolution:
            downsampling training images from the set of training images to the current stage resolution; and sampling from the downsampled training images to obtain the set of training images having the current stage resolution; and responsive to the current stage resolution being the final resolution, sampling from the set of training images to obtain the set of training images having the current stage resolution.

13. The computer-implemented method of claim 9 wherein the step of adding one or more neural network layers to the updated current stage energy-based model to create a higher resolution energy-based model for a next stage comprises:

removing a red-green-blue (RGB) block that transforms a 3-channel RGB image to a z-channel feature map, where z is number of channels of each kernel at a bottom convolutional layer of the updated current stage energy-based model and that has the current stage resolution; and adding an expanding block and a new RGB block that each have the higher resolution.

14. The computer-implemented method of claim 9 further comprising:

using the trained energy-based model having the final resolution to generate a synthesized image at the final resolution.

15. A computer-implemented method for training an energy-based model comprising:

starting with a minimal resolution energy-based model and successively increasing model resolution capability through stages until a final resolution capability for the energy-based is reached, each stage comprising steps comprising:

updating a current stage energy-based model using:

(1) values obtained using a set of target domain images at a current stage resolution and the current stage energy-based model; and (2) values obtained using a set of synthesized images at the current stage resolution and the current stage energy-based model;

responsive to the current stage energy-based model not having the final resolution capability:

adding one or more neural network layers to the updated current stage energy-based model to create a higher resolution energy-based model for a next stage;

setting the higher resolution energy-based model as the current stage energy-based model for a next iteration; and returning to the step of updating a current stage energy-based model for the next iteration; and responsive to the current stage energy-based model having the final resolution capability, outputting the updated current stage energy-based model as a trained energy-based model having the final resolution.

16. The computer-implemented method of claim 15 further comprising:

responsive to being a first iteration:

obtaining the set of target domain images having the current stage resolution by sampling from a set of images; and obtaining the set of synthesized images at the current stage resolution by performing steps comprising:

initializing the set of synthesized images at the current stage resolution by sampling from a set of source domain images; and updating, via Markov chain Monte Carlo (MCMC) sampling, the set of synthesized images using the current stage energy-based model.

17. The computer-implemented method of claim 15 further comprising:

obtaining the set of target domain images at the current stage resolution by sampling from a set of images in the target domain; and obtaining the set of synthesized images at the current stage resolution by performing steps comprising:

initializing a set of current stage synthesized images having the current stage resolution by sampling from a set of training images in a source domain;

initializing a set of prior stage synthesized images having a prior stage resolution by sampling from a corresponding set of training images having the prior stage resolution which corresponds to the images sampled from a set of training images in the source domain that were used to initialize the set of current stage synthesized images;

updating, via Markov chain Monte Carlo (MCMC) sampling, the set of prior stage synthesized images using a prior stage energy-based model;

generating a set of smoothed synthesized images at the current stage resolution by combining the set of current stage synthesized images with the set of prior stage synthesized images that have been upsampled to the current stage resolution; and updating, via Markov chain Monte Carlo (MCMC) sampling, the set of synthesized images given the set of smoothed synthesized images and the current stage energy-based model.

18. The computer-implemented method of claim 17 wherein the step of obtaining the set of target domain images having the current stage resolution by sampling from a set of images in the target domain comprises:

given a set of target domain training images at the final resolution:

responsive to the current stage resolution not being the final resolution:

downsampling training images from the set of target domain training images to the current stage resolution; and sampling from the downsampled training images to obtain the set of target domain images having the current stage resolution; and responsive to the current stage resolution being the final resolution, sampling from the set of target domain training images to obtain the set of target domain images.

19. The computer-implemented method of claim 15 wherein the step of adding one or more neural network layers to the updated current stage energy-based model to create a higher resolution energy-based model for a next stage comprises:

removing a red-green-blue (RGB) block that transforms a 3-channel RGB image to a z-channel feature map, where z is number of channels of each kernel at a bottom convolutional layer of the updated current stage energy-based model and that has the current stage resolution; and adding an expanding block and a new RGB block that each have the higher resolution.

20. The computer-implemented method of claim 15 further comprising:
using the trained energy-based model having the final resolution to generate a synthesized image in the target domain.

* * * * *